US007018568B2

(12) United States Patent
Tierney

(10) Patent No.: US 7,018,568 B2
(45) Date of Patent: Mar. 28, 2006

(54) HIGHLY CATALYTIC SCREEN-PRINTING INK

(75) Inventor: Michael J. Tierney, San Jose, CA (US)

(73) Assignee: Animas Technologies LLC, West Chester, PA (US)

( * ) Notice: Subject to any disclaimer, the term of this patent is extended or adjusted under 35 U.S.C. 154(b) by 425 days.

(21) Appl. No.: 10/327,506

(22) Filed: Dec. 19, 2002

(65) Prior Publication Data

US 2003/0155557 A1 Aug. 21, 2003

Related U.S. Application Data

(60) Provisional application No. 60/409,234, filed on Sep. 6, 2002, provisional application No. 60/342,277, filed on Dec. 20, 2001.

(51) Int. Cl.
*H01B 1/22* (2006.01)

(52) U.S. Cl. ...................... 252/511; 252/500; 252/502; 252/504; 106/1.21; 106/1.24; 204/294; 204/292; 204/290.15

(58) Field of Classification Search ................ 252/502, 252/511, 514, 518; 106/31.16, 31.77, 31.85, 106/31.92, 1.21, 1.24; 525/333.3; 204/403.15, 204/294, 292, 290.15; 600/347
See application file for complete search history.

(56) References Cited

U.S. PATENT DOCUMENTS

| | | | |
|---|---|---|---|
| 3,457,113 A | 7/1969 | Diebert | |
| 4,933,062 A | 6/1990 | Shaw et al. | |
| 5,174,925 A * | 12/1992 | Fujii et al. | 252/514 |
| 5,231,028 A | 7/1993 | Mullen | |
| 5,653,918 A | 8/1997 | Towlson | |
| 5,776,372 A | 7/1998 | Saito et al. | |
| 5,795,453 A | 8/1998 | Gilmartin | |
| 5,851,438 A | 12/1998 | Chan | |
| 5,928,571 A | 7/1999 | Chan | |
| 6,042,751 A | 3/2000 | Chan | |
| 6,309,535 B1 | 10/2001 | Williams | |
| 6,587,705 B1 | 7/2003 | Kim et al. | |
| 6,599,408 B1 | 7/2003 | Chan et al. | |
| 6,627,058 B1 * | 9/2003 | Chan | 204/403.15 |

FOREIGN PATENT DOCUMENTS

| | | |
|---|---|---|
| EP | 0 987 333 | 3/2000 |
| EP | 0 942 278 B1 | 6/2002 |
| GB | 2 335 278 A | 9/1999 |

OTHER PUBLICATIONS

Alegret, S., et al., "Carbon-Polymer Biocomposites for Amperometric Sensing," Biosensors & Bioelectronics, 11:1/2 35-44 (1996).

* cited by examiner

*Primary Examiner*—Mark Kopec
*Assistant Examiner*—Kallambella Vijayakumar
(74) *Attorney, Agent, or Firm*—RatnerPrestia

(57) ABSTRACT

The invention is directed to conductive polymer compositions, catalytic ink compositions (e.g., for use in screen-printing), electrodes produced by deposition of an ink composition, methods of making, and methods of using thereof. An exemplary ink material comprises platinum black and/or platinum-on-carbon as the catalyst, graphite as a conducting material, a polymer binding material, and an organic solvent. The polymer binding material is typically a copolymer of hydrophilic and hydrophobic monomers. The conductive polymer compositions of the present invention can be used, for example, to make electrochemical sensors. Such sensors can be used in a variety of analyte monitoring devices to monitor analyte amount or concentrations in subjects, for example, glucose monitoring devices to monitor glucose levels in subjects with diabetes.

30 Claims, 5 Drawing Sheets

HIGHLY CATALYTIC SCREEN-PRINTING INK

CROSS-REFERENCE TO RELATED APPLICATIONS

This application is related to U.S. Provisional Patent Applications Ser. Nos. 60/342,277, filed 20 Dec. 2001, and 60/409,234, filed 6 Sep. 2002, from which priority is claimed under 35 USC §119(e)(1), and which applications are incorporated herein by reference in their entireties.

TECHNICAL FIELD

The present invention relates generally to conductive polymer film compositions used, for example, in the manufacturing of medical electrodes.

BACKGROUND OF THE INVENTION

Numerous systems for monitoring glucose amount or concentration in a subject are known in the art, including, but not limited to the following: U.S. Pat. Nos. 5,362,307, 5,279,543, 5,695,623; 5,713,353; 5,730,714; 5,791,344; 5,840,020; 5,995,860; 6,026,314; 6,044,285; 6,113,537; 6,188,648, 6,326,160, 6,309,351, 6,299,578, 6,298,254, 6,284,126, 6,272,364, 6,233,471, 6,201,979, 6,180,416, 6,144,869, 6,141,573, 6,139,718, 6,023,629, 5,989,409, 5,954,685, 5,827,183, 5,771,890, and 5,735,273.

Self-monitoring of blood glucose (BG) is a critical part of managing diabetes. However, most procedures for obtaining such information are invasive, painful and provide only periodic measurements. Results from the Diabetes Control and Complication Trial Research Group, (The Diabetes Control and Complication Trial Research Group. *N Engl J Med.* 1993;329:997–1036), UK Prospective Diabetes Study (UK Prospective Diabetes Study (UKPDS) Group. *Lancet.* 1998;352:837–853), and Kumamoto trials (Ohkubo Y, Kishikawa H, Araki E, et al. *Diabetes Res Clin Pract.* 1995;28: 103–117) showed that a tight glucose control regiment, which uses frequent glucose measurements to guide the administration of insulin or oral hypoglycemic agents, leads to a substantial decrease in the long-term complications of diabetes; however, there was a 3-fold increase in hypoglycemic events (The Diabetes Control and Complication Trial Research Group. *N Engl J Med.* 1993;329:997–1036.). Moreover, as many as 7 BG measurements per day were not sufficient to detect a number of severe hypoglycemic and hypoglycemic events (Ohkubo Y, Kishikawa H, Araki E, et al. *Diabetes Res Clin Pract.* 1995;28:103–117.).

The commercially available GlucoWatch® (Cygnus Inc., Redwood City, Calif.) biographers (Tamada, et al., JAMA 282:1839–1844, 1999) provide a means to obtain painless, automatic, frequent and noninvasive glucose measurements (see, for example, U.S. Pat. Nos. 6,326,160, 6,309,351, 6,299,578, 6,298,254, 6,284,126, 6,272,364, 6,233,471, 6,201,979, 6,180,416, 6,144,869, 6,141,573, 6,139,718, 6,023,629, 5,989,409, 5,954,685, 5,827,183, 5,771,890, and 5,735,273). The first generation device provides up to 3 readings per hour for as long as 12 hours after a single BG measurement for calibration (Tamada, et al., JAMA 282: 1839–1844, 1999). The second generation device, the GlucoWatch® G2™ (Cygnus Inc., Redwood City, Calif.) biographer, provides up to six readings per hour for as long as 13 hours after a single BG measurement for calibration. The devices provide detailed information on glucose patterns and trends. The devices use an electrode produced by thick film deposition of an ink material.

The ink material usually consists of platinum black and/or platinum-on-carbon as the catalyst, graphite as a conducting material, a polymer binding material, and an organic solvent. U.S. Pat. No. 6,042,751 to Chan and Kuty pertains to a conductor composition of up to 5% platinum powders and/or platinum deposited on graphite, modified graphite and a thermoplastic polymer such as the styrene-containing acrylic copolymers poly(styrene-acrylonitrile). U.S. Pat. No. 6,309,535 to Williams et al. pertains to an electrode consisting of graphite particles coated with a transition metal catalyst, carbon particles, and a binder that is a vinyl chloride/vinyl acetate copolymer.

U.S. Pat. No. 5,928,571 to Chan discloses a conductive composition for iontophoretic electrodes containing silver particles, silver chloride particles, carbon and graphite as the conducting material, and a copolymer of hydrophilic and hydrophobic monomers. The hydrophobic monomers can be styrene, and the hydrophilic monomers can be acrylates.

The above-described compositions have several disadvantages, for example, they have a high cost of manufacture, and/or they are difficult to manufacture.

The present invention provides methods and compositions for improving performance of analyte monitoring systems that employ sensing electrodes, for example, the GlucoWatch biographer.

SUMMARY OF THE INVENTION

The present invention relates to conductive polymer composite compositions (e.g., a catalytic screen-printing ink, an electrode ink formulation), electrodes produced using the compositions of the present invention, as well as methods of making and using the compositions of the present invention.

In one aspect, the present invention relates to composition comprising between about 0.01% to about 5% (of total weight of the dry composition, i.e., without solvent) more preferably in the range of about 0.1% to about 2% (of total weight of the dry composition, i.e., without solvent) of a transition metal catalyst; an electrically conductive material; and a polymer obtained by polymerizing a compound of formula (I) with a compound of formula (II)

(I)

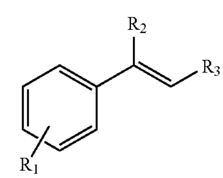

(II)

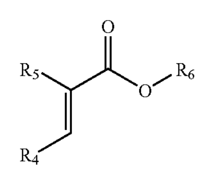

wherein $R_1$, $R_2$, $R_3$, $R_4$, $R_5$, and $R_6$ are independently selected from the group consisting of hydrogen, an alkyl having from 1 to 6 carbon atoms, and a cycloalkyl group having from 4 to 8 carbon atoms. Further, $R_1$ may be a hydroxyl group.

The composition may further comprise an organic solvent (e.g., a glycol diacetate, such as ethylene glycol diacetate).

In preferred embodiments the transition metal catalyst is selected from the group consisting of platinum, palladium, and rhodium. In one embodiment the transition metal catalyst is platinum. In a preferred embodiment, the catalyst is platinum on carbon.

In one embodiment, in formula (I) and formula (II), $R_1$, $R_2$ and $R_4$ are hydrogen. In this embodiment, $R_5$ and $R_6$ may be independently selected from the group consisting of hydrogen, methyl, ethyl, propyl, isopropyl, and butyl. In a further aspect of this embodiment, $R_3$ is H, $R_5$ is methyl, and $R_6$ is methyl or ethyl.

In another embodiment of the present invention, in formula (I) and formula (II) $R_1$, $R_2$, $R_3$, and $R_4$ are hydrogen, and $R_5$ and $R_6$ are methyl.

In yet another embodiment, $R_1$ is a hydroxyl group.

In yet a further embodiment, the polymer is obtained by polymerizing, monomer formula (I), monomer formula (II), and one or more additional monomers.

The conductive material may be, for example, synthetic graphite, pyrolytic graphite, or natural graphite.

In another aspect, the present invention includes an ink composition, comprising about 0.003% to about 1.6% by weight of a transition metal catalyst, an electrically conductive material, a polymer obtained by polymerizing a compound of formula (I) with a compound of formula (II)

(I)

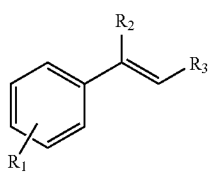

(II)

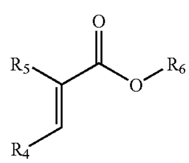

wherein $R_1$, $R_2$, $R_3$, $R_4$, $R_5$, and $R_6$ are independently selected from the group consisting of hydrogen, an alkyl having from 1 to 6 carbon atoms, and a cycloalkyl group having from 4 to 8 carbon atoms, and an organic solvent. Further, $R_1$ may be a hydroxyl group. The organic solvent may, for example, be a glycol diacetate (e.g., ethylene glycol diacetate). The transition metal catalyst may, for example, comprise a platinum-group metal (including, for example, platinum, palladium, rhodium, ruthenium, osmium, iridium, and combinations and mixtures thereof). The catalyst may, for example, be platinum on carbon.

In another aspect, the present invention includes an ink composition, comprising, between about 0.003% to about 1.6% (of total weight of the composition, including solvent, electrically conductive material, transition metal catalyst, and polymer) transition metal catalyst, more preferably in the range of about 0.03 to about 1% (of total weight of the composition, including solvent, electrically conductive material, transition metal catalyst, and polymer) of a transition metal catalyst; a polymer obtained by polymerizing substituted or unsubstituted styrene and $R_7C(CH_2)C(O)OR_8$, wherein $R_7$ and $R_8$ are independently selected to be hydrogen or lower alkyl; graphite; and glycol diacetate. Such an ink composition may be used, for example, in a method of producing an electrode. A method of producing an electrode may comprise depositing the ink composition via screen-printing or other printing methods.

In this aspect of the present invention the transition metal catalyst may, for example, be selected from the group consisting of platinum, palladium, and rhodium. In one embodiment, the catalyst is platinum. In a further embodiment, the catalyst is platinum on carbon.

In one embodiment of this aspect of the present invention, $R_7$ and $R_8$ are methyl.

The graphite may, for example, be synthetic graphite or pyrolytic graphite. The glycol diacetate may, for example, be ethylene glycol diacetate.

In yet another aspect, the present invention relates to a conductive polymer composite composition comprising between about 0.003% to about 1.6% (of total weight of the composition, including solvent, electrically conductive material, transition metal catalyst, and polymer) of platinum, more preferably in the range of about 0.03 to about 1% (of total weight of the composition, including solvent, electrically conductive material, transition metal catalyst, and polymer) of platinum, a poly(styrene methyl methacrylate) binder, graphite, and a solvent. In one embodiment of this aspect of the present invention, the graphite is synthetic graphite or pyrolytic graphite. The solvent may, for example, be a glycol diacetate, for example, ethylene glycol diacetate.

In another aspect, the present invention relates to electrodes produced using the compositions of the invention. Such electrodes may be part of, for example, a sensor element, an electrode assembly, or an AutoSensor assembly. The electrodes of the present invention typically comprise a conductive polymer composition, as described herein, deposited on a non-conducting substrate. Electrode assemblies of the present invention may comprise electrode components in addition to a sensing electrode comprising the conductive polymer compositions of the present invention, for example, such assemblies may comprise one or more sensing electrodes, one or more counter electrodes, one or more reference electrodes, and/or one or more iontophoretic electrodes. In one embodiment, a bimodal electrode comprises a sensing electrode comprising a conductive polymer composition of the present invention and a Ag/AgCl electrode that acts, for example, as an iontophoretic/counter electrode.

In another aspect the present invention relates to a method of producing the conductive polymer compositions described herein. The method typically comprises, mixing of a transition metal catalyst, electrically conductive material, polymer, and a suitable solvent to obtain a mixture, for example, a homogenous mixture. The solvent is then removed. Removal of the solvent results in a conductive polymer composition.

In yet another aspect, the present invention includes a method of making electrodes. The method typically comprises, mixing a transition metal catalyst, electrically conductive material, polymer, and a suitable solvent to obtain a mixture (for example, a homogenous mixture). The mixture is then deposited on a non-conducting substrate. Removal of the solvent typically results in the making of an electrode having a reactive surface comprising a conductive polymer composition of the present invention.

These and other embodiments of the present invention will readily occur to those of ordinary skill in the art in view of the disclosure herein.

DETAILED DESCRIPTION OF THE INVENTION

Figure 1A:
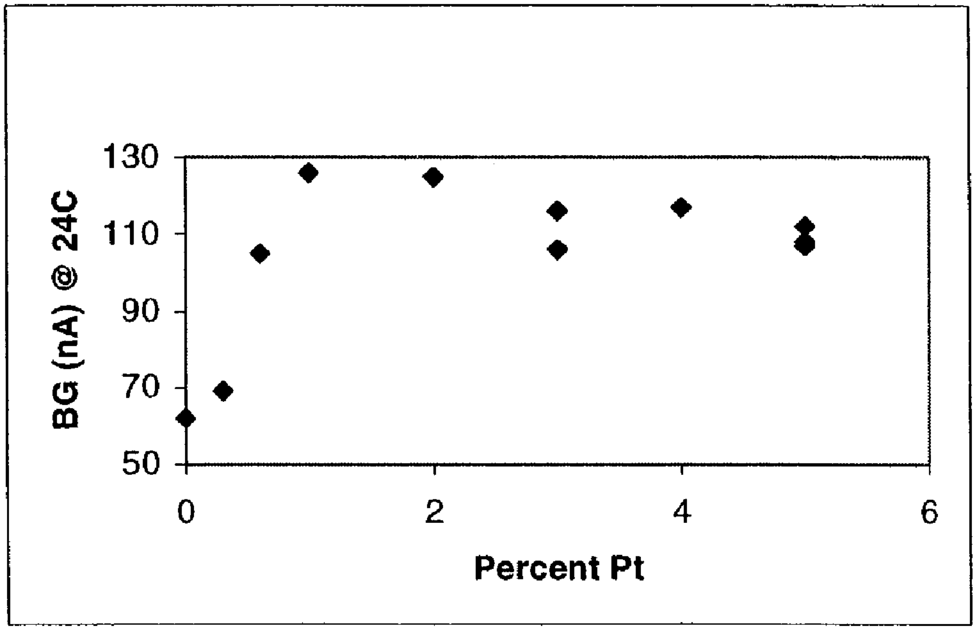
FIG. 1A presents a plot of nanoamp background current measurements obtained at 24° C. relative to the percent platinum in the ink composition.

All publications, patents and patent applications cited herein are hereby incorporated by reference in their entireties.

1.0 Definitions

It is to be understood that the terminology used herein is for the purpose of describing particular embodiments only, and is not intended to be limiting. As used in this specification and the appended claims, the singular forms "a", "an" and "the" include plural referents unless the context clearly dictates otherwise. Thus, for example, reference to "a reservoir" includes a combination of two or more such reservoirs, reference to "an analyte" includes mixtures of analytes, and the like.

Unless defined otherwise, all technical and scientific terms used herein have the same meaning as commonly understood by one of ordinary skill in the art to which the invention pertains. Although other methods and materials similar, or equivalent, to those described herein can be used in the practice of the present invention, the preferred materials and methods are described herein.

In describing and claiming the present invention, the following terminology will be used in accordance with the definitions set out below.

The term "microprocessor" refers to a computer processor contained on an integrated circuit chip, such a processor may also include memory and associated circuits. A microprocessor may further comprise programmed instructions to execute or control selected functions, computational methods, switching, etc. Microprocessors and associated devices are commercially available from a number of sources, including, but not limited to, Cypress Semiconductor Corporation, San Jose, Calif.; IBM Corporation, White Plains, N.Y.; Applied Microsystems Corporation, Redmond, Wash.; Intel Corporation, Chandler, Ariz.; and, National Semiconductor, Santa Clara, Calif.

The terms "analyte" and "target analyte" are used to denote any physiological analyte of interest that is a specific substance or component that is being detected and/or measured in a chemical, physical, enzymatic, or optical analysis. A detectable signal (e.g., a chemical signal or electrochemical signal) can be obtained, either directly or indirectly, from such an analyte or derivatives thereof. Furthermore, the terms "analyte" and "substance" are used interchangeably herein, and are intended to have the same meaning, and thus encompass any substance of interest. In preferred embodiments, the analyte is a physiological analyte of interest, for example, glucose, or a chemical that has a physiological action, for example, a drug or pharmacological agent.

A "sampling device," "sampling mechanism" or "sampling system" refers to any device and/or associated method for obtaining a sample from a biological system for the purpose of determining the concentration of an analyte of interest. Such "biological systems" include any biological system from which the analyte of interest can be extracted, including, but not limited to, blood, interstitial fluid, perspiration and tears. Further, a "biological system" includes both living and artificially maintained systems. The term "sampling" mechanism refers to extraction of a substance from the biological system, generally across a membrane such as the stratum corneum or mucosal membranes, wherein said sampling is invasive, minimally invasive, semi-invasive or non-invasive. The membrane can be natural or artificial, and can be of plant or animal nature, such as natural or artificial skin, blood vessel tissue, intestinal tissue, and the like. Typically, the sampling mechanism is in operative contact with a "reservoir," or "collection reservoir," wherein the sampling mechanism is used for extracting the analyte from the biological system into the reservoir to obtain the analyte in the reservoir. Non-limiting examples of sampling techniques include iontophoresis, sonophoresis (see, e.g., International Publication No. WO 91/12772, published 5 Sep. 1991; U.S. Pat. No. 5,636,632), suction, electroporation, thermal poration, passive diffusion (see, e.g., International Publication Nos.: WO 97/38126 (published 16 Oct. 1997); WO 97/42888, WO 97/42886, WO 97/42885, and WO 97/42882 (all published Nov. 20, 1997); and WO 97/43962 (published 27 Nov. 1997)), microfine (miniature) lances or cannulas, biolistic (e.g., using particles accelerated to high speeds), subcutaneous implants or insertions, and laser devices (see, e.g., Jacques et al. (1978) J. Invest. Dermatology 88:88–93; International Publication WO 99/44507, published 1999 Sep. 10; International Publication WO 99/44638, published 1999 Sep. 10; and International Publication WO 99/40848, published 1999 Aug. 19). Iontophoretic sampling devices are described, for example, in International Publication No. WO 97/24059, published 10 Jul. 1997; European Patent Application EP 0942 278, published 15 Sep. 1999; International Publication No. WO 96/00110, published 4 Jan. 1996; International Publication No. WO 97/10499, published 2 Mar. 1997; U.S. Pat. Nos. 5,279,543; 5,362,307; 5,730,714; 5,771,890; 5,989,409; 5,735,273; 5,827,183; 5,954,685 and 6,023,629, all of which are herein incorporated by reference in their entireties. Further, a polymeric membrane may be used at, for example, the electrode surface to block or inhibit access of interfering species to the reactive surface of the electrode.

The term "physiological fluid" refers to any desired fluid to be sampled, and includes, but is not limited to, blood, cerebrospinal fluid, interstitial fluid, semen, sweat, saliva, urine and the like.

The term "artificial membrane" or "artificial surface," refers to, for example, a polymeric membrane, or an aggregation of cells of monolayer thickness or greater which are grown or cultured in vivo or in vitro, wherein said membrane or surface functions as a tissue of an organism but is not actually derived, or excised, from a pre-existing source or host.

A "monitoring system" or "analyte monitoring device" refers to a system useful for obtaining frequent measurements of a physiological analyte present in a biological system. Such a system may comprise, but is not limited to, a sampling mechanism, a sensing mechanism, and a microprocessor mechanism in operative communication with the sampling mechanism and the sensing mechanism. The GlucoWatch biographers are examples of monitoring systems.

A "measurement cycle" typically comprises extraction of an analyte from a subject, using, for example, a sampling device, and sensing of the extracted analyte, for example, using a sensing device, to provide a measured signal, for example, a measured signal response curve. A complete measurement cycle may comprise one or more sets of extraction and sensing.

The term "frequent measurement" refers to a series of two or more measurements obtained from a particular biological system, which measurements are obtained using a single device maintained in operative contact with the biological system over a time period in which a series of measurements (e.g., second, minute or hour intervals) is obtained. The term thus includes continual and continuous measurements.

The term "subject" encompasses any warm-blooded animal, particularly including a member of the class Mammalia such as, without limitation, humans and nonhuman primates such as chimpanzees and other apes and monkey species; farm animals such as cattle, sheep, pigs, goats and horses; domestic mammals such as dogs and cats; laboratory animals including rodents such as mice, rats and guinea pigs, and the like. The term does not denote a particular age or sex and, thus, includes adult and newborn subjects, whether male or female.

The term "transdermal" includes both transdermal and transmucosal techniques, i.e., extraction of a target analyte across skin, e.g., stratum corneum, or mucosal tissue. Aspects of the invention, which are described herein in the context of "transdermal," unless otherwise specified, are meant to apply to both transdermal and transmucosal techniques.

The term "transdermal extraction," or "transdermally extracted" refers to any sampling method, which entails extracting and/or transporting an analyte from beneath a tissue surface across skin or mucosal tissue. The term thus includes extraction of an analyte using, for example, iontophoresis (reverse iontophoresis), electroosmosis, sonophoresis, microdialysis, suction, and passive diffusion. These methods can, of course, be coupled with application of skin penetration enhancers or skin permeability enhancing technique such as various substances or physical methods such as tape stripping or pricking with micro-needles. The term "transdermally extracted" also encompasses extraction techniques which employ thermal poration, laser microporation, electroporation, microfine lances, microfine cannulas, subcutaneous implants or insertions, combinations thereof, and the like.

The term "iontophoresis" refers to a method for transporting substances across tissue by way of an application of electrical energy to the tissue. In conventional iontophoresis, a reservoir is provided at the tissue surface to serve as a container of (or to provide containment for) material to be transported. Iontophoresis can be carried out using standard methods known to those of skill in the art, for example by establishing an electrical potential using a direct current (DC) between fixed anode and cathode "iontophoretic electrodes," alternating a direct current between anode and cathode iontophoretic electrodes, or using a more complex waveform such as applying a current with alternating polarity (AP) between iontophoretic electrodes (so that each electrode is alternately an anode or a cathode). For example, see U.S. Pat. Nos. 5,771,890, 6,023,629, 6,298,254, and PCT Publication No. WO 96/00109, published 4 Jan. 1996.

The term "reverse iontophoresis" refers to the movement of a substance from a biological fluid across a membrane by way of an applied electric potential or current. In reverse iontophoresis, a reservoir is provided at the tissue surface to receive the extracted material, as used in the GlucoWatch biographer glucose monitors.

"Electroosmosis" refers to the movement of a substance through a membrane by way of an electric field-induced convective flow. The terms iontophoresis, reverse iontophoresis, and electroosmosis, will be used interchangeably herein to refer to movement of any ionically charged or uncharged substance across a membrane (e.g., an epithelial membrane) upon application of an electric potential to the membrane through an ionically conductive medium.

The term "sensing device," or "sensing mechanism," encompasses any device that can be used to measure the concentration or amount of an analyte, or derivative thereof, of interest. Preferred sensing devices for detecting blood analytes generally include electrochemical devices, optical and chemical devices and combinations thereof. Examples of electrochemical devices include the Clark electrode system (see, e.g., Updike, et al., (1967) Nature 214:986–988), and other amperometric, coulometric, or potentiometric electrochemical devices, as well as, optical methods, for example UV detection or infrared detection (e.g., U.S. Pat. No. 5,747,806). For example, U.S. Pat. No. 5,267,152 to Yang et al. describes a noninvasive technique of measuring blood glucose concentration using near-IR radiation diffuse-reflection laser spectroscopy. Near-IR spectrometric devices are also described in U.S. Pat. No. 5,086,229 to Rosenthal, et al., U.S. Pat. No. 5,747,806, to Khalil, et al., and U.S. Pat. No. 4,975,581, to Robinson, et al.

A "biosensor" or "biosensor device" includes, but is not limited to, a "sensor element" that includes, but is not limited to, a "biosensor electrode" or "sensing electrode" or "working electrode" which refers to the electrode that is monitored to determine the amount of electrical signal at a point in time or over a given time period, which signal is then correlated with the concentration of a chemical compound. The sensing electrode comprises a reactive surface that converts the analyte, or a derivative thereof, to electrical signal. The reactive surface can be comprised of any electrically conductive material such as, but not limited to, platinum-group metals (including, platinum, palladium, rhodium, ruthenium, osmium, and iridium), nickel, copper, and silver, as well as, oxides, and dioxides, thereof, and combinations or alloys of the foregoing, which may include carbon as well. Some catalytic materials, membranes, and fabrication technologies suitable for the construction of amperometric biosensors are described by Newman, J. D., et al.(1995) Analytical Chemistry 67:4594–4599.

The "sensor element" can include components in addition to the sensing electrode, for example, it can include a "reference electrode" and a "counter electrode." The term "reference electrode" is used to mean an electrode that provides a reference potential, e.g., a potential can be established between a reference electrode and a working electrode. The term "counter electrode" is used to mean an electrode in an electrochemical circuit that acts as a current source or sink to complete the electrochemical circuit. Although it is not essential that a counter electrode be employed where a reference electrode is included in the circuit and the electrode is capable of performing the function of a counter electrode, it is preferred to have separate counter and reference electrodes because the reference potential provided by the reference electrode is most stable when it is at equilibrium. If the reference electrode is required to act further as a counter electrode, the current flowing through the reference electrode may disturb this equilibrium. Consequently, separate electrodes functioning as counter and reference electrodes are preferred.

In one embodiment, the "counter electrode" of the "sensor element" comprises a "bimodal electrode." The term "bimodal electrode" typically refers to an electrode which is capable of functioning non-simultaneously as, for example, both the counter electrode (of the "sensor element") and the iontophoretic electrode (of the "sampling mechanism") as described, for example, U.S. Pat. No. 5,954,685, herein incorporated by reference in its entirety.

The terms "reactive surface," and "reactive face" are used interchangeably herein to mean the surface of the sensing electrode that: (1) is in contact with the surface of an ionically conductive material which contains an analyte or through which an analyte, or a derivative thereof, flows from a source thereof; (2) is comprised of a catalytic material (e.g., a platinum group metal, platinum, palladium, rhodium, ruthenium, or nickel and/or oxides, dioxides and combinations or alloys thereof) or a material that provides sites for electrochemical reaction; (3) converts a chemical signal (for example, hydrogen peroxide) into an electrical signal (e.g., an electrical current); and (4) defines the electrode surface area that, when composed of a reactive material, is sufficient to drive the electrochemical reaction at a rate sufficient to generate a detectable, reproducibly measurable, electrical signal when an appropriate electrical bias is supplied, that is correlatable with the amount of analyte present in the electrolyte.

An "ionically conductive material" refers to any material that provides ionic conductivity, and through which electrochemically active species can diffuse. The ionically conductive material can be, for example, a solid, liquid, or semi-solid (e.g., in the form of a gel) material that contains an electrolyte, which can be composed primarily of water and ions (e.g., sodium chloride), and generally comprises 50% or more water by weight. The material can be in the form of a hydrogel, a sponge or pad (e.g., soaked with an electrolytic solution), or any other material that can contain an electrolyte and allow passage of electrochemically active species, especially the analyte of interest. Some exemplary hydrogel formulations are described in published PCT International Patent Application Nos. WO 97/02811 and WO 00/64533. The ionically conductive material may comprise a biocide. For example, during manufacture of an AutoSensor assembly, one or more biocides may be incorporated into the ionically conductive material. Biocides of interest include, but are not limited to, compounds such as chlorinated hydrocarbons; organometallics; hydrogen releasing compounds; metallic salts; organic sulfur compounds; phenolic compounds (including, but not limited to, a variety of Nipa Hardwicke Inc. liquid preservatives registered under the trade names Nipastat®, Nipaguard®, Phenosept®, Phenonip®, Phenoxetol®, and Nipacide®); quaternary ammonium compounds; surfactants and other membrane-disrupting agents (including, but not limited to, undecylenic acid and its salts), combinations thereof, and the like.

"Hydrophilic compound" refers to a monomer that attracts, dissolves in, or absorbs water. The hydrophilic compounds for use according to the invention are one or more of the following: carboxy vinyl monomer, a vinyl ester monomer, an ester of a carboxy vinyl monomer, a vinyl amide monomer, a hydroxy vinyl monomer, a cationic vinyl monomer containing an amine or a quaternary ammonium group. The monomers can be used to make the polymers or co-polymers including, but not limited to, polyethylene oxide (PEO), polyvinyl alcohol, polyacrylic acid, and polyvinyl pyrrolidone (PVP).

The term "buffer" refers to one or more components which are added to a composition in order to adjust or maintain the pH of the composition.

The term "electrolyte" refers to a component of the ionically conductive medium which allows an ionic current to flow within the medium. This component of the ionically conductive medium can be one or more salts or buffer components, but is not limited to these materials.

The term "collection reservoir" is used to describe any suitable containment method or device for containing a sample extracted from a biological system. For example, the collection reservoir can be a receptacle containing a material that is ionically conductive (e.g., water with ions therein), or alternatively it can be a material, such as a sponge-like material or hydrophilic polymer, used to keep the water in place. Such collection reservoirs can be in the form of a sponge, porous material, or hydrogel (for example, in the shape of a disk or pad). Hydrogels are typically referred to as "collection inserts." Other suitable collection reservoirs include, but are not limited to, tubes, vials, strips, capillary collection devices, cannulas, and miniaturized etched, ablated or molded flow paths.

A "collection insert layer" is a layer of an assembly or laminate comprising one or more collection reservoir (or collection insert) located, for example, between a mask layer and a retaining layer.

A "laminate" refers to structures comprised of, at least, two bonded layers. The layers may be bonded by welding or through the use of adhesives. Examples of welding include, but are not limited to, the following: ultrasonic welding, heat bonding, and inductively coupled localized heating followed by localized flow. Examples of common adhesives include, but are not limited to, chemical compounds such as, cyanoacrylate adhesives, and epoxies, as well as adhesives having such physical attributes as, but not limited to, the following: pressure sensitive adhesives, thermoset adhesives, contact adhesives, and heat sensitive adhesives.

A "collection assembly" refers to structures comprised of several layers, where the assembly includes at least one collection insert layer, for example a hydrogel. An example of a collection assembly as referred to in the present invention is a mask layer, collection insert layer, and a retaining layer where the layers are held in appropriate functional relationship to each other but are not necessarily a laminate (i.e., the layers may not be bonded together. The layers may, for example, be held together by interlocking geometry or friction).

The term "mask layer" refers to a component of a collection assembly that is substantially planar and typically contacts both the biological system and the collection insert layer. See, for example, U.S. Pat. Nos. 5,827,183, 5,735,273, 6,141,573, 6,201,979, and 6,370,410 all herein incorporated by reference.

The term "gel retaining layer" or "gel retainer" refers to a component of a collection assembly that is substantially planar and typically contacts both the collection insert layer and the electrode assembly. See, for example, U.S. Pat. Nos. 6,393,318, 6,341,232, and 6,438,414, all herein incorporated by reference.

The term "support tray" typically refers to a rigid, substantially planar platform and is used to support and/or align the electrode assembly and the collection assembly. The support tray provides one way of placing the electrode assembly and the collection assembly into the sampling system.

An "AutoSensor assembly" refers to a structure generally comprising a mask layer, collection insert layer, a gel retaining layer, an electrode assembly, and a support tray. The AutoSensor assembly may also include liners where the layers are held in approximate, functional relationship to each other. Exemplary collection assemblies and AutoSensor structures are described, for example, U.S. Pat. Nos. 5,827,183, 5,735,273, 6,141,573, 6,201,979, 6,370,410, 6,393,318, 6,341,232, and 6,438,414, all herein incorporated by reference. These exemplary collection assemblies and AutoSensors may be modified by use of the ionically conductive materials (e.g., hydrogels) of the present invention. The mask and retaining layers are preferably composed of materials that are substantially impermeable to the analyte (chemical signal) to be detected; however, the material can be permeable to other substances. By "substantially impermeable" is meant that the material reduces or eliminates chemical signal transport (e.g., by diffusion). The material can allow for a low level of chemical signal transport, with the proviso that chemical signal passing through the material does not cause significant edge effects at the sensing electrode.

The terms "about" or "approximately" when associated with a numeric value refers to that numeric value plus or minus 10% of the unit of measure (e.g., percent, grams, degrees or volts).

By the term "printed" is meant a substantially uniform deposition of a conductive polymer composite film (e.g., an electrode ink formulation) onto one surface of a substrate (i.e., the base support). It will be appreciated by those skilled in the art that a variety of techniques may be used to effect substantially uniform deposition of a material onto a substrate, e.g., Gravure-type printing, extrusion coating, screen coating, spraying, painting, electroplating, laminating, or the like. See, for example, "Polymer Thick Film, by Ken Gilleo, New York:Van Nostrand Reinhold, 1996, pages 171–185.

The term "physiological effect" encompasses effects produced in the subject that achieve the intended purpose of a therapy. In preferred embodiments, a physiological effect means that the symptoms of the subject being treated are prevented or alleviated. For example, a physiological effect would be one that results in the prolongation of survival in a patient.

"Parameter" refers to an arbitrary constant or variable so appearing in a mathematical expression that changing it give various cases of the phenomenon represented (McGraw-Hill Dictionary of Scientific and Technical Terms, S. P. Parker, ed., Fifth Edition, McGraw-Hill Inc., 1994). In the context of the GlucoWatch biographer, a parameter is a variable that influences the value of the blood glucose level as calculated by an algorithm.

"Decay" refers to a gradual reduction in the magnitude of a quantity, for example, a current detected using a sensor electrode where the current is correlated to the concentration of a particular analyte and where the detected current gradually reduces but the concentration of the analyte does not.

"Skip" or "skipped" signals refer to data that do not conform to predetermined criteria (for example, error-associated criteria as described in U.S. Pat. No. 6,233,471, herein incorporated by reference). A skipped reading, signal, or measurement value typically has been rejected (i.e., a "skip error" generated) as not being reliable or valid because it does not conform with data integrity checks, for example, where a signal is subjected to a data screen which invalidates incorrect signals based on a detected parameter indicative of a poor or incorrect signal.

As used herein, the term "styrene" is meant to include styrene and the substituted styrenes e.g., alpha-methylstyrene, vinyl toluene, chlorostyrene, hydroxystyrene, and t-butylstyrene. As used in this invention, styrene is present in an amount between about 10% to about 90% by weight in the reaction mixture, more preferably, about 40% to about 80% by weight.

The term "alkyl" as used herein refers to a straight, branched, or cyclic hydrocarbon chain fragment containing between about one and about twenty carbon atoms, more preferably between about one and about eight carbon atoms, for example, methyl, ethyl, n-propyl, iso-propyl, cyclopropyl, n-butyl, iso-butyl, tert-butyl, cyclobutyl, cyclooctyl, and the like. Straight, branched, or cyclic hydrocarbon chains having eight or fewer carbon atoms will also be referred to herein as "lower alkyl." The hydrocarbon chains may further include one or more degrees of unsaturation, i.e., one or more double or triple bonds, as in, for example, vinyl, propargyl, allyl, 2-buten-1-yl, 2-cyclopenten-1-yl, cyclooctene and the like.

The terms "GlucoWatch biographer" and "GlucoWatch G2 biographer" refer to two exemplary devices in a line of GlucoWatch biographer monitoring devices developed and manufactured by Cygnus, Inc., Redwood City, Calif.

The GlucoWatch® Biographers

The GlucoWatch biographers are analyte monitoring devices that provide automatic, frequent, and noninvasive glucose measurements. The first generation device, GlucoWatch® (Cygnus, Inc., Redwood City, Calif.) biographer, provides up to 3 readings per hour for as long as 12 hours after a 3-hour warm-up period and a single blood glucose (BG) measurement for calibration. The second generation device, GlucoWatch® G2™ (Cygnus Inc., Redwood City, Calif.) biographer, provides up to six readings per hour for as long as 13 hours after a single BG measurement for calibration. These devices utilize a reverse iontophoresis to extract glucose through the skin. The glucose is then detected by an amperometric biosensor. The GlucoWatch biographers are small wristwatch-like device containing sampling and detection circuitry, and a digital display. Clinical trials on subjects with Type 1 and Type 2 diabetes have shown excellent correlation between GlucoWatch biographer readings and serial finger-stick BG measurements (see, e.g., Garg, S. K., et al., Diabetes Care 22, 1708 (1999); Tamada, J. A., et al., JAMA 282, 1839 (1999)). However, the first generation GlucoWatch biographer measurement period is limited to 12 hours, due to decay of the biosensor signal during use. The second generation device extends the measurement period to up to 13 hours. Similar signal decay has also been observed for implantable glucose monitors (Gross, T. M., et al., Diabetes Technology and Therapeutics 2, 49 (2000); Meyerhoff, C., et al., Diabetologia, 35, 1087 (1992); Bolinder, J., et al., Diabetes Care 20, 64 (1997)), for which up to four calibrations per 24 hours of monitoring is recommended to maintain the device accuracy (Medtronic-MiniMed Web Page: *Continuous Glucose Monitoring System, Frequently Asked Questions*, www.minimed.com).

The GlucoWatch biographers have several advantages. Clearly their non-invasive and non-obtrusive nature encourages more glucose testing among people with diabetes. Of greater clinical relevance is the frequent nature of the information provided. The GlucoWatch biographers provide the more frequent monitoring desired by physicians in an automatic, non-invasive, and user-friendly manner. The automatic nature of the systems also allow monitoring to continue even while the patient is sleeping or otherwise unable to test. The GlucoWatch biographers are the only non-invasive, frequent and automatic glucose-monitoring devices approved by the U.S. Food and Drug Administration and that are commercially available.

Device Description of the GlucoWatch Biographers

The GlucoWatch biographers contain the electronic components that supply iontophoretic current and controls current output and operating time. They also control the biosensor electronics, as well as receive, process, display and store data. Data can also be uploaded from the GlucoWatch biographers to a PC. They have watchbands to help secure them to sites on the forearm.

The AutoSensor (see, for example, FIG. 2) is a consumable part of the devices that provides up to 13 hours of continuous glucose measurement (in the second generation device). The AutoSensor is discarded after each wear period. It fits into the back of the GlucoWatch biographers and contains electrodes for delivery of iontophoretic current, sensor electrodes for sensing the glucose signal, and glucose-oxidase-containing hydrogel pads for glucose collection and conversion to hydrogen peroxide. There are two gel/electrode sets on each AutoSensor, denoted as A and B.

Iontophoresis utilizes the passage of a constant low-level electrical current between two electrodes applied onto the surface of the skin. This technique has been used, for example, to deliver transdermally ionic (charged) drugs (Sinh J., et al., *Electrical properties of skin*, in "Electronically controlled drug delivery," Berner B, and Dinh S M, eds., Boca Raton, Fla.: CRC Press (1998), pp. 47–62.). On the other hand, electrolyte ions in the body can also act as the charge carriers and can lead to extraction of substances from the body outward through the skin. This process is known as "reverse iontophoresis" (Rao, G., et al., Pharm. Res. 10, 1751 (2000)). Because skin has a net negative charge at physiological pH, positively charged sodium ions are the major current carriers across the skin. The migration of sodium ions toward the iontophoretic cathode creates an electro-osmotic flow, which carries neutral molecules by convection. However, only compounds with small molecular weight pass through the skin, so that, for example, no proteins are extracted. Moreover, major interfering species (e.g., ascorbate and urate) are collected at the anode. As a result of these unique charge and size exclusion properties of reverse iontophoresis, glucose is preferentially extracted at the cathode, and the obtained sample is very "clean." This is in contrast to implantable glucose monitoring devices (Gross, T. M., Diabetes Technology and Therapeutics 2, 49 (2000); Meyerhoff, C., et al., Diabetologia, 35, 1087 (1992); Bolinder, J., et al., Diabetes Care 20, 64 (1997)) for which ascorbate and urate (as well as some proteins) are known to produce an interfering signal.

The feasibility of iontophoretic glucose extraction was demonstrated both in cadaver skin (Glikfeld, P., et al., Pharm. Res. 6, 988 (1989)) and in human subjects (Tamada, J. A., et al., Nat. Med. 1, 1198 (1995)). In feasibility studies with human subjects, glucose transport correlated well with BG in a linear manner. However, the sensitivity (i.e., the amount of glucose extracted) varied among individuals and skin sites (Tamada, J. A., et al., Nat. Med. 1, 1198 (1995)). A single-point calibration was found to compensate for this variability. Reverse iontophoresis yields micromolar concentrations of glucose in the receiver solution, which is about three orders of magnitude less than that found in blood.

To accurately measure this small amount of glucose, the GlucoWatch biographers utilize an amperometric biosensor (Tierney, M. J., et al., Clin. Chem. 45, 1681 (1999)). The glucose oxidase (GOx) enzyme in hydrogel disks (where glucose is collected via reverse iontophoresis) catalyzes the reaction of glucose with oxygen to produce gluconic acid and hydrogen peroxide, $$\text{Glucose} + O_2 \xrightarrow{\text{GOx}} \text{Gluconic Acid} + H_2O_2.$$

Glucose exists in two forms: α and β-glucose, which differ only in the position of a hydroxyl group. At equilibrium (also in blood and in interstitial fluid), the two forms are in proportion of about 37% α and about 63% β. As glucose enters the hydrogel, it diffuses throughout, and only the β-form of glucose reacts with the GOx enzyme. As β-form is depleted, the α-form then converts (mutarotates) to the β-form. The products of the GOx reaction (hydrogen peroxide and gluconic acid) also diffuse throughout the gel. Finally, peroxide is detected at a platinum-containing working electrode in the sensor via the electro-catalytic oxidation reaction, $$H_2O_2 \rightarrow O_2+2H^++2e^-$$

producing measurable electrical current, and regenerating $O_2$. Thus, ideally, for every glucose molecule extracted, two electrons are transferred to the measurement circuit. Integration over time of the resulting electric current leads to the total charge liberated at the electrode, and the latter is correlated to the amount of glucose collected through the skin.

With the GlucoWatch biographer devices (there are no differences in the AutoSensors for the first and second generation devices), extraction and detection are achieved using two hydrogel pads placed against the skin. The side of each pad away from the skin is in contact with an electrode assembly containing two sets of iontophoretic and sensing elements. The two electrode sets complete the iontophoretic circuit. During operation, one iontophoretic electrode is cathodic and the other anodic, enabling the passage of current through the skin. As a consequence, glucose and other substances are collected in the hydrogel pads during the iontophoretic extraction period. The iontophoretic time interval is adjusted to minimize skin irritation and power requirements, yet extract sufficient glucose for subsequent detection. It has been found that a useful time for extraction of glucose is about three minutes.

On the side of each hydrogel pad away from the skin and adjacent to the annular iontophoretic electrode, are the sensing electrodes (for example, printed electrodes comprising the compositions of the present invention). There are two sensing electrodes. These circular sensing electrodes are composed of a platinum composite, and are activated by applying a potential of 0.25–0.8 V (relative to a Ag/AgCl reference electrode). At these applied potentials, a current is then generated from the reaction of $H_2O_2$ (generated from extracted glucose) that has diffused to the platinum sensor electrode.

Device Operation of the GlucoWatch Biographers

Figure 3:
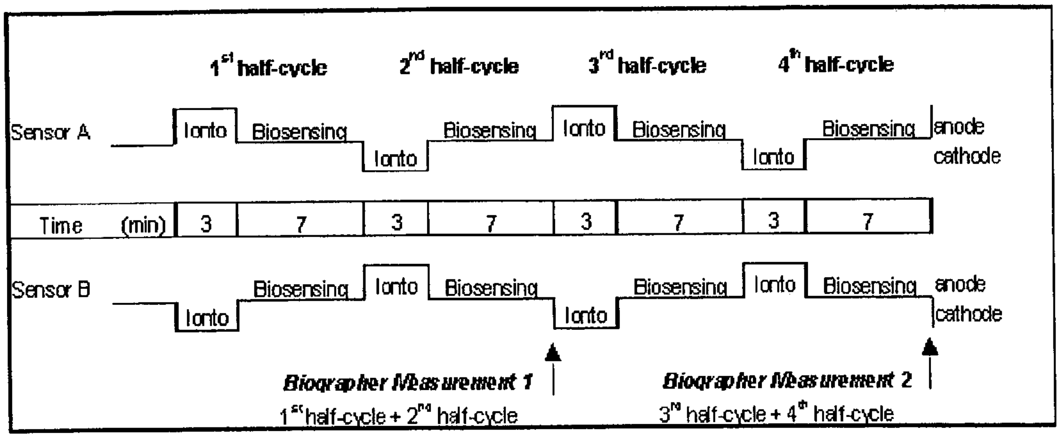
FIG. 3 presents a schematic of the iontophoretic current profile of the extraction and detection cycles at both sensors (A and B) of the GlucoWatch biographer.

Each 20 minute glucose measurement cycle consists of three minutes of extraction, and seven minutes of biosensor activation, followed by three minutes of extraction at the opposite iontophoresis current polarity, and seven additional minutes of biosensor activation. This is schematically illustrated in FIG. 3 for the first generation GlucoWatch biographer.

In the first half-cycle, glucose is collected in the hydrogel at the iontophoretic cathode (Sensor B). As the glucose is collected, it reacts with the GOx in the hydrogel to produce $H_2O_2$. At the end of the three-minute collection period, the iontophoretic current is stopped, and the biosensors activated for seven minutes to measure the accumulated $H_2O_2$. This period is chosen so that the vast majority of the extracted glucose is converted to $H_2O_2$, and that the vast majority of this peroxide diffuses to the platinum electrode, and subsequently oxidizes to generate a current. Because the underlying physical and chemical processes (diffusion, glucose mutarotation, and electro-catalytic oxidation reaction at the sensing electrodes) are rather slow, not all of the extracted glucose and $H_2O_2$ is consumed during the seven-minute measurement cycle. However, the integrated current (or charge) signal over this seven-minute interval is sufficiently large and remains proportional to the total amount of glucose that entered the hydrogel pad during the iontophoresis interval. In the process of detection, majority of $H_2O_2$ is depleted. This "cleans out" the hydrogel to be ready for the next collection period. Moreover, before sensor B will be collecting and measuring glucose again, it has to act as an iontophoretic anode first. The extraction-sensing cycles have been designed so that there will be no peroxide left in the hydrogel after this period. During the initial three-minute period, there is also extraction at the anode (sensor A), primarily of anionic species such as urate and ascorbate. These electrochemically active species are also purged from the anodic reservoir during the seven-minute biosensor period.

In the second half-cycle of the measurement cycle, the iontophoretic polarity is reversed, so that glucose collection at the cathode occurs in the second reservoir (sensor A), and the anionic species are collected in the first reservoir (sensor B). The biosensor is again activated to measure glucose at the cathode (now sensor A) and to purge electrochemically active species for the anode (sensor B). The combined twenty-minute process is repeated to obtain each subsequent glucose reading.

Figure 4:
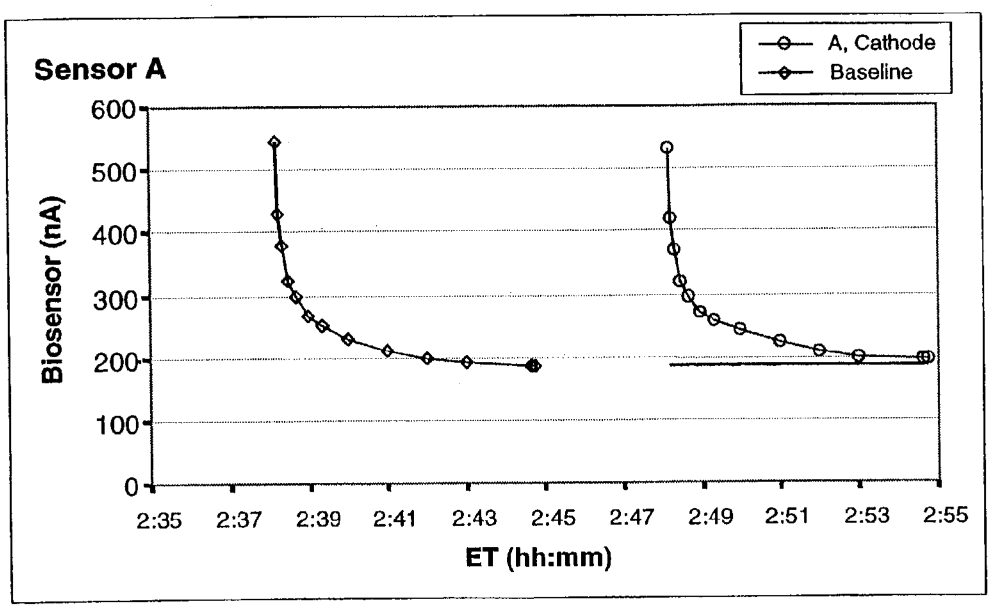
FIG. 4 presents example raw sensor A current signals for the anodic (diamonds, left-hand side curve) and cathodic (circles, right-hand side curve) cycles. The line in the cathodic cycle represents the baseline background based on an average of the last two readings of the anodic cycle.

The raw data for each half-cycle are collected for both A and B sensors as 13 discrete current values measured as functions of time over the seven minutes (providing a measured signal response curve, see, for example, FIG. 4). Typical current signals for one of the sensors obtained in an anodic ("diamond" curve), and a subsequent cathodic ("circle" curve) cycle are shown in FIG. 4. When the sensor circuits are activated in the cathodic cycle, $H_2O_2$ (converted from glucose) reacts with the platinum electrode to produce a current, which monotonically declines with time over the seven-minute detection cycle. A current signal of similar shape is also generated in the anodic cycle ("diamond" curve). This signal is due, in large part, to ascorbic and uric acids. In both cases the current transients come down to a background of approximately 180 nA rather than zero. The background current, termed the "baseline background," does not vary much over time, indicating that it is likely the result of the sum of a number of low concentration species. In order to extract the glucose-related signal only, the background is subtracted from the total current signal. Although the background, once subtracted, does not introduce a significant bias to the glucose measurement, it does significantly decrease the signal-to-noise ratio of the measurement in the hypoglycemic region. This increased noise increases the potential error in the glucose measurement in the hypoglycemic range. It is therefore important to determine the background current as accurately as possible. Because there is not enough time in the seven-minute cathodic cycle to consume $H_2O_2$ completely, the current at the end of this cycle is still decreasing, and therefore cannot be used as a good estimation of the background. On the other hand, it was found that the current stabilizes earlier in anodic cycles. Therefore, the baseline background is typically deterrmined as the average of the last two current readings of the preceding anodic cycle. This approach (called "previous background" approach) is illustrated in FIG. 4.

After the background subtraction, the cathodic current signal is integrated to calculate the electrical charge (on the order of μC) liberated at the cathode, which is proportional to the total amount of glucose extracted through the skin. In graphical terms, this corresponds to the calculation of the area between the curve and the line on the right-hand side of FIG. 4. Integration has the added value that it compensates for variations in gel thickness and temperature, as these variables affect only the rate, not the extent of reaction. The integrated signal at the cathodal sensor for each half cycle are averaged as $(C_A+C_B)/2$, a procedure that improves signal-to-noise ratio of the system.

Finally, the averaged charge signal is converted into a glucose measurement based on a patient's finger-stick calibration value (entered at the beginning of the monitoring period). From the calibration, a relationship between charge signal detected by the sensor and blood glucose is determined. This relationship is then used to determine glucose values based on biosensor signal measurements. The latter is achieved by utilizing a signal processing algorithm called "Mixture of Experts" (MOE) (Kurnik, R. T., Sensors and Actuators B 60, 1 (1999); U.S. Pat. Nos. 6,180,416, and 6,326,160, herein incorporated by reference in their entireties). The MOE algorithm incorporates: integrated charge signal, calibration glucose value, charge signal at calibration, and time since calibration (i.e., elapsed time). It calculates each glucose reading as a weighted average of predictions obtained from three independent linear models ("Experts"), which depend on the four inputs and a set of 30 optimized parameters. Equations to perform this data conversion have been developed, optimized, and validated on a large data set consisting of GlucoWatch biographer and reference BG readings from clinical trials on diabetic subjects. This data conversion algorithm is programmed into a dedicated microprocessor in the GlucoWatch biographer.

The glucose readings provided by the GlucoWatch biographers lag the actual blood glucose by about 15–20 minutes. This lag is derived not only from the inherent measurement lag resulting from the time-averaging of glucose signals performed by the GlucoWatch biographers, but also from the physiological differences between the concentration of glucose in interstitial fluid (which is measured by the GlucoWatch biographers) and the instantaneous glucose concentration in blood (as typically measured via a finger prick). The measurement lag is 13.5 minutes. GlucoWatch biographers glucose reading correspond to the average glucose concentration in interstitial fluid during the two preceding 3-minute extraction periods (separated by the first 7-minute sensing period) and it is provided to the user after the second 7-minute sensing period, resulting in the 13.5 minute measurement lag, (3+7+3)/2+7=13.5, FIG. 3). The additional physiological lag is estimated as about 5 minutes.

The GlucoWatch biographers perform a series of data integrity checks before computing each glucose value. The checks, called "screens", selectively prevent certain glucose values from being reported to the user based on certain environmental, physiological, or technical conditions. The screens are based on four measurements taken during the course of wear: current (electrochemical signal), iontophoretic voltage, temperature, and skin surface conductance. Removed points are called "skips". For example, if sweat is detected by an increased skin surface conductance, the glucose reading is skipped because the sweat could contain glucose, which could interfere with the glucose extracted from the skin during the iontophoretic period. Other skips are based on noise detected in the signal.

Figure 5:
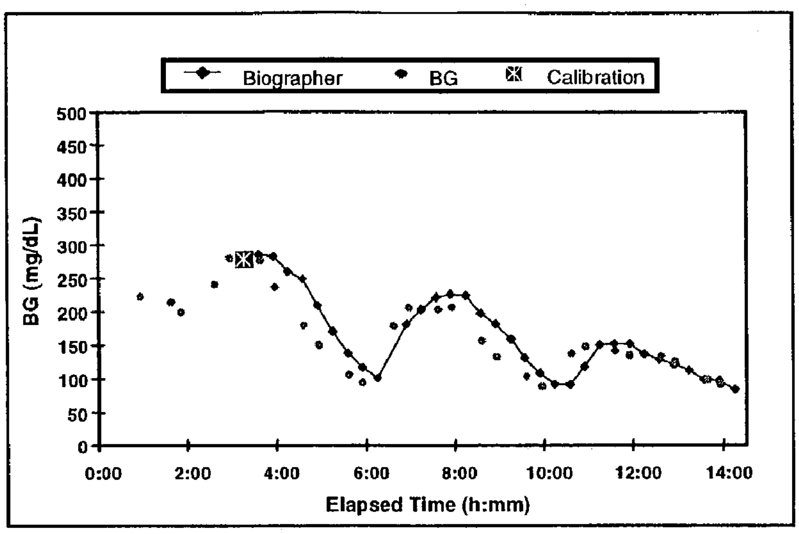
FIG. 5 presents an exemplary comparison of GlucoWatch biographer measurements and conventional BG measurements obtained by the finger-prick method.

An exemplary blood glucose profile, as measured by the GlucoWatch biographer, and compared to finger stick measurements for one subject, is given in FIG. 5. These results show that after a calibration at three hours of elapsed time, the GlucoWatch biographer produced values up to three times per hour. Note that occasionally the GlucoWatch biographer "skipped" a measurement. This is the result of a series of the data integrity checks described above that ensures that only data of predetermined quality are displayed.

2.0 General Overview of the Inventions

Before describing the present invention in detail, it is to be understood that this invention is not limited to particular types of ink compositions, conductive polymer compositions, conductive polymer film compositions, screen-printing inks, electrodes, electrode sensors, laminates, AutoSensors, or methods of making or using the same, as use of such particulars may be selected in view of the teachings of the present specification. It is also to be understood that the terminology used herein is for the purpose of describing particular embodiments of the invention only, and is not intended to be limiting.

In one aspect the present invention relates to compositions comprising between about 0.01% to about 5% (of total weight of the dry composition, i.e., without solvent), more preferably in the range of about 0.1% to about 2% (of total weight of the dry composition, i.e., without solvent) of one or more transition metal catalysts, one or more electrically conductive materials, and one or more polymer binders. Exemplary ranges for components comprising the dry compositions of the present invention are as follows: 0.01% to about 5% (of total weight of the dry composition, i.e., without solvent) of a transition metal catalyst, graphite about 50% to about 75% (of total weight of the dry composition, i.e., without solvent), and polymer about 15% to about 25% (of total weight of the dry composition, i.e., without solvent), wherein for any combination the total dry weight equals 100%.

In another aspect, compositions of the present invention may additionally comprise an organic solvent. In one embodiment, the present invention relates to ink compositions comprising between about 0.003% to about 1.6% (of total weight of the composition, including solvent, electrically conductive material, transition metal catalyst, and polymer), more preferably in the range of about 0.03 to about 1% (of total weight of the composition, including solvent, electrically conductive material, transition metal catalyst, and polymer) of one or more transition metal catalyst, one or more electrically conductive materials, one or more polymer binders, and one or more solvents. Exemplary ranges for components comprising the ink compositions of the present invention are as follows: 0.003% to about 1.6% (of total weight of the composition, including solvent, electrically conductive material, transition metal catalyst, and polymer) of a transition metal catalyst, graphite about 15% to about 25% (of total weight of the composition, including solvent, electrically conductive material, transition metal catalyst, and polymer), and polymer about 4% to about 8% (of total weight of the composition, including solvent, electrically conductive material, transition metal catalyst, polymer), and an organic solvent about 50% to about 80% (of total weight of the composition, including solvent, electrically conductive material, transition metal catalyst, and polymer), wherein for any ink composition combination the total weight equals 100%.

As is suitable, the catalysts employed in the subject method typically involve the use of metals that can catalyze the oxidation of hydrogen peroxide. In general, any transition metal may be used as the catalyst, such as, for example, a metal selected from one of Groups 3–12 of the periodic table or from the lanthanide series. However, in preferred embodiments, the metal will be selected from the group of late transition metals, preferably from Groups 5–12, more preferably from Groups 8–10, even more preferably from transition metals catalysts. For example, suitable catalysts include platinum, palladium, ruthenium, iridium, osmium, and rhodium, as well as mixtures thereof. In a preferred embodiment, the transition metal catalyst is platinum.

The transition metal catalyst is present preferably in the range of between about 0.003% to about 1.6% (of total weight of the composition, including solvent, electrically conductive material, transition metal catalyst, and polymer; before using the composition to create an electrode, for example, by printing). More preferably the catalyst is present in the range of between about 0.03 to about 1% (of total weight of the composition, including solvent, electrically conductive material, transition metal catalyst, and polymer).

In general, the transition metal catalysts for use in the invention are obtained from commercial sources and used without further processing. The transition metal catalysts for use in the present composition can be, for example, in the form of a finely divided powder or can be deposited on a solid support, such as graphite or carbon. The transition metal powder preferably possesses high surface area and small particle size. An exemplary metal powder catalyst that is useful in the present invention is platinum black that typically has a surface area of greater than 5 $m^2/g$. In one aspect, the metal powder catalysts have a surface area that is about 5–60 $m^2/g$, or more preferably about 5–30 $m^2/g$. Typically, the particle size of the transition metal powder is typically less than about 50 microns, preferably less than about 20 microns, more preferably less than about 10 microns, and most preferably less than 1 micron.

In another embodiment, the transition metal catalyst is deposited on a solid support prior to use in the composition of the invention. The solid support is preferably a good electrical conductor but inert to electrochemical reaction. Solid supports for use in the invention include, but are not limited to, graphite and carbon. Metal catalysts supported on solids, such as platinum on graphite, can be obtained from commercial sources or prepared by methods known in the art. The metal/solid support ratio is typically in the range of about 10/90 to about 0.5/99.5.

For the preparation of the compositions of the present invention, between about 0.01% to about 5% (of total weight of the dry composition, i.e., without solvent) more preferably in the range of about 0.1% to about 2% (of total weight of the dry composition, i.e., without solvent) transition metal catalyst, such as metal-on-graphite (for example, platinum-on-graphite), is used to give a total catalyst content of, for example, about 1% (e.g., 1 part metal catalyst to 99 parts graphite). Subsequently, metal catalyst, for example platinum black, may be added to increase the catalyst content up to the final concentration of 5% (e.g., 5 parts metal catalyst to 95 parts graphite). For compositions of less than about 1% metal catalyst (e.g., 1 part metal catalyst to 99 parts graphite), only the metal-on-graphite is typically used as the source of the catalyst.

The compositions of the invention additionally comprise an electrically conductive material. Any electrically conductive material can be used, and the material may also be heat-conductive. The electrically conductive material is preferably a good electrical conductor but inert to electrochemical reaction, for example, graphite and conductive carbon particles can be used. Graphite materials suitable for the compositions of the invention include, but are not limited to, synthetic, pyrolytic, or natural graphite, and are normally obtained from commercial sources or prepared using known methods. For example, synthetic graphite can be made from petroleum coke, pyrolytic graphite can be made from natural gas, or obtained from a commercial source, such as Timrex SFG-15 graphite from Timcal Ltd. in Bodio, Switzerland. Optionally, the graphite material may be purified, such as by a high temperature electro-crystallization process, prior to use. Typically, the electrically conductive material has particles with diameters of about 1–30 microns with average particle diameter in the range of about 6–12 microns.

The compositions of the invention additionally comprise an organic binder. The organic binder is preferably a polymeric binder, more preferably a thermoplastic binder. The organic binder, preferably a polymer, is selected such that it provides, for example, a matrix for holding the catalyst and the electrically conductive material together, forms a coating that is scratch resistant, has good adhesion properties, is electrochemically inert, and is soluble in an organic solvent. Without being bound to a particular theory, it is generally believed that a hydrophilic polymeric binder de-wets the graphite particles to a greater extent during drying, thereby increasing the graphite surface that is exposed on the surface of the electrode which consequently exposes the catalyst, such as platinum, deposited onto the graphite. The de-wetting process thereby reduces printing defects and increases the sensitivity of the electrode. Thus, the polymer for use in the methods and compositions of the invention is selected such that it has a high degree of hydrophilicity, to a degree sufficient to provide high sensitivity when formulated into an ink, but retains enough hydrophobicity to provide cohesive strength to the dried printed ink.

The organic binders of the invention can be polymers. The polymers for use in the invention can be prepared from a single monomer, or prepared from two or more monomers as block copolymers or by random copolymerization. Preferably, the polymer comprises a copolymer prepared by polymerizing a compound of formula (I) with a compound of formula (II):

(I)

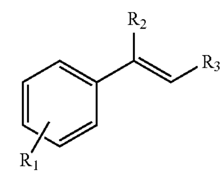

(II)

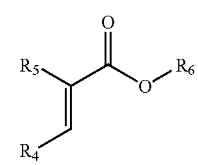

wherein $R_1$, $R_2$, $R_3$, $R_4$, $R_5$, and $R_6$ are independently selected from the group consisting of hydrogen, an alkyl having from 1 to 6 carbon atoms, and a cycloalkyl group having from 4 to 8 carbon atoms. Further, $R_1$ may be a hydroxyl group. The polymer may further comprise one or more additional monomers. In a preferred embodiment, one monomer is styrene, and the second monomer of formula (II) wherein $R_4$ is hydrogen, and $R_5$ and $R_6$ are independently selected from the group consisting of hydrogen, methyl, ethyl, propyl, isopropyl, and butyl. In another embodiment, the second monomer is an alkyl methacrylate. The alkyl methacrylate monomers that, are useful in the practice of this invention are typically obtained by the reaction of methacrylic acid and alkyl alcohols. The alkyl methacrylates can contain from 1 to 8 carbon atoms in the alkyl chain. Representative useful methacrylic monomers include methyl methacrylate, ethyl methacrylate, tert-butyl methacrylate, butyl methacrylate, isobutyl methacrylate, propyl methacrylate, 2-ethylhexyl methacrylate, isoamyl methacrylate, hexyl methacrylate, octyl methacrylate, cyclohexyl methacrylate, and the like. The alkyl methacrylates used in the formation of the polymeric binder of the invention is at a concentration from about 40% to about 90% by weight of the mixture of monomers, and styrene is at a concentration of about 10% to about 60% by weight of the mixture of monomers. Preferably, the alkyl methacrylate monomer having 1 to 8 carbon atoms is from about 50% to about 80%, and the styrene monomer is from about 25% to about 50% by weight of the mixture of monomer.

In another embodiment, the polymer is obtained by polymerizing substituted or unsubstituted styrene and $R_7C(CH_2)C(O)OR_8$, wherein $R_7$ and $R_8$ are independently selected to be hydrogen or lower alkyl.

In another embodiment, the polymer is obtained by polymerizing monomer formula (I), monomer formula (II), and one or more additional monomers, for example, acrylic acid. The polymer may, for example, be a terpolymer.

The polymeric binder can be obtained from commercial sources or can be prepared by polymerizing the monomers. The polymer can be prepared by known methods, for example, bulk polymerization, solution polymerization, suspension polymerization, emulsion polymerization, dispersion polymerization and the like. Typically, the polymers are prepared under free radical addition polymerization conditions. These conditions,typically involve the gradual addition, frequently over a period of several hours, of a mixture of unreacted monomers and free radical initiators into a solvent solution that is generally maintained at a reaction temperature typically ranging from room temperature to 200° C. The reaction mixture is typically “chased” after all the monomer has been added by the addition of additional free radical initiator to ensure more complete polymerization. Suitable polymers can be prepared by conducting the reaction in the presence of an ester or ketone, such as n-butyl acetate or methyl amyl ketone in the presence of suitable initiators such as t-butyl perbenzoate, t-butyl peroctoate or azobis(2-methylbutyronitrile). Other useful free radical initiators well known in the art include azobis(2-methylbutyronitrile), dipropyl peroxide, di-t-butyl peroxide, cumene hydroperoxide, t-butyl perbenzoate, t-butyl peroctoate and the like. The total amount of initiator used throughout the reaction will typically be from 0.5% to about 10%, preferably about 4% to about 9% by weight of the total monomer charge.

In another aspect of the present invention, the organic binder comprises the copolymer described above (e.g., by polymerizing the monomers shown above as formula (I) and formula (II), or the monomers shown above as formula (I) and formula (II) in addition to one or more additional monomers), as well as one or more other polymers. The one or more other polymers may be copolymers (i.e., comprises of two or more monomers) or a polymer comprised of a single monomer (e.g., polymethylmethacrylate). In addition, the one or more other polymers may also be the same copolymer described above with a different molecular weight range (e.g., a mixture of high and low molecular weight polymers).

The methods and compositions of the invention may optionally comprise a solvent. A solvent is selected such that it is capable of, for example, dissolving the polymer binder, has a low electrochemical activity, is inert towards catalysis by the metal catalyst that is used, and is capable of evaporating at a suitable rate such that the ink dries during sensor printing. Typically, the solvent is an organic solvent selected from the groups of alkyl and aryl ketones, aromatic hydrocarbon, glycol diacetates and glycol acetates or mixtures thereof. A preferred glycol diacetate solvent for use in the invention is ethylene glycol diacetate.

A typical composition of the invention can be prepared by methods known in the art following the guidance of the present specification (e.g., Example 1). Typically, a binder solution is prepared by dissolving a thermoplastic polymer in a suitable solvent.

A suitable solvent for use in the composition of the present invention typically has low levels of electrochemically-active impurities (i.e., has low electrochemical activity) in order to maintain low background current, is able to dissolve the polymer binder, and has an evaporation rate suitable for electrode printing and production. Typically the solvent is inert to transition metal-catalyzed chemical reactions. Exemplary solvents include, but are not limited to, alkyl and aryl ketones, aromatic hydrocarbons, glycol acetates, glycol diacetates, and mixtures thereof. Use of ethylene glycol diacetate, in formulation of a catalyst ink of the present invention, is described in Example 1.

A typical transition metal-graphite composition of the present invention may be prepared as follows. First, a polymer solution is prepared by dissolving a polymer, as described herein, in a suitable solvent. Dispersion of the graphite powder and the transition metal—graphite powder in the polymer solution may be prepared by various mixing techniques, e.g., by roll-milling, high-speed dispersion, or planetary mixing. Additional solvent may be added. The resulting composition is suitable for deposition, e.g., by screen-printing.

The concentration of the polymer solution will depend on the solubility of the polymer in the solvent. When the polymer is poly(styrene-co-methyl methacrylate) and the solvent is ethylene glycol diacetate, about one part of the polymer is dissolved in about three parts of the solvent. To the polymer solution thus prepared is added the electrically conductive material, the transition metal catalyst, and, if necessary, more solvent. The catalyst is normally present at a concentration in the range of between about 0.003% to about 1.6% (of total weight of the composition, including solvent, electrically conductive material, transition metal catalyst, and polymer) transition metal catalyst, more preferably in the range of about 0.03 to about 1% (of total weight of the composition, including solvent, electrically conductive material, transition metal catalyst, and polymer) of a transition metal catalyst.

The amount of the electrically conductive material will depend on the type of material chosen, and can be expressed as a ratio of the polymer to the electrically conductive material. When the material is graphite, the ratio of polymer: graphite is preferably about 1:3 to about 1:5, more preferably about 1:3.5. The resulting mixture is mixed by hand until a homogeneous mixture is obtained. The mixing process is subsequently completed by running the homogeneous mixture through a triple mill, for example, up to 5 times. The composition is now suitable for screen printing, although additional solvent may be added to adjust the viscosity of the solution.

The conductive polymer composition may be deposited on, for example, a non-conductive substrate by a conventional printing process. Exemplary printing processes include, but are not limited to, the following: thick film printing (e.g., screen printing), lithography, letter press printing, vapor deposition, spray coating, ink jet printing, laser jet printing, roller coating, vacuum deposition, and combinations thereof. The non-conductive substrate is typically heat stabilized, prior to deposition of the conducting layers, to confer dimensional stability. Exemplary non-conductive substrates include, but are not limited to, a polyester sheet material, polycarbonate, polyvinyl chloride, high density polypropylene, low density polypropylene. In a preferred embodiment, the non-conductive substrate is a polyester sheet.

After deposition of conductive polymer composition, the polymer binder may be stabilized or cured by a number of conventional processes, including, but not limited to, forced air drying (e.g., at elevated temperatures), infra-red irradiation, ultraviolet irradiation, ion-beam irradiation, gamma irradiation, and combinations thereof. These processes typically result, to varying degrees, in the cross-linking of individual molecules of the polymer binder. When ultraviolet radiation is used inclusion of a photo-sensitizing reagent, to initiate the polymer cross-linking reaction, may be desirable to include in the conductive polymer composition.

Example 2 describes comparisons of various ink compositions. In Example 2, the compositions with no catalyst served as the controls. The platinum-free ink had lower background and no sensitivity to peroxide, as expected. The ink compositions with 5% to 1% Pt (these percentages are Pt/graphite percentages and are represented as weight percent Pt of the total graphite, i.e., without solvent or binder) had higher background than the control and the ink compositions having less than 1% Pt (this percentage is Pt/graphite percentage and is represented as weight percent Pt of the total graphite, i.e., without solvent or binder) had backgrounds in between. However, the performance of the compositions containing 5%–0.3% Pt (these percentages are Pt/graphite percentages and are represented as Pt weight percent of the total graphite, i.e., without solvent or binder) was comparable. These data demonstrate that by using poly(styrene-co-methyl methacrylate) as the polymer binder, the catalyst concentration can be reduced to 1% or lower (these percentages are Pt/graphite percentages and are represented as weight percent Pt of the total graphite, i.e., without solvent or binder) and retain acceptable sensitivity.

Example 3 describes the performance of an ink formulation of the present invention to a previously used ink composition. The data demonstrated that the ink formulation of the present invention provides comparable, if not superior, performance relative to the previously used ink composition.

Example 4 describes use of the ink formulation of the present invention in a sensor used to track blood glucose over time in a person with diabetes. The results (FIG. 6) show that the ink formulation of the present invention provides good tracking of the blood glucose over the course of the study in a person with diabetes.

In one aspect, the conductive polymer compositions of the present invention are used in methods of making electrodes. The present invention also includes electrodes made using the compositions described herein. For example, the conductive polymer, compositions may be deposited as a single electrode, a micro-electrode or as a microelectrode array. The electrode may be used in conjunction with a counter electrode, and a reference electrode deposited on the same substrate. For example, an electrode assembly may be produced by depositing a conductive polymer composition on a non-conducting substrate and depositing a second conducting layer comprising silver/silver chloride, to function as reference and counter electrodes, adjacent to the first layer. One example of such an electrode assembly is the bimodal electrode described herein and shown in FIG. 7. In the bimodal electrode configuration the counter electrode (of the “sensor element”) and the iontophoretic electrode (of the “sampling mechanism”) function non-simultaneously (for example, as in U.S. Pat. No. 5,954,685, herein incorporated by reference in its entirety).

Electrodes of the present invention have several characteristics that make their use desirable for measuring low concentrations of analytes (e.g., glucose) including, but not limited to, low background noise electrochemistry (which is particularly important when measuring low levels of electrical current).

Electrodes of the present invention may be used for the analysis of analytes (or chemical species) that can be directly oxidized or reduced by the removal or addition of electrons at the electrode. The electrodes may also be used to detect analytes (or chemical species) that can be converted by an enzyme to form a product that can be directly oxidized or reduced by the removal or addition of electrons at the electrode. In one embodiment of the present invention, the electrode is derivatized with or held in association with one or more enzymes, e.g., glucose oxidase. In one embodiment, an enzyme is maintained on the electrode in a layer that is separate from but in intimate contact with the reactive surface of the electrode (e.g., as in an AutoSensor described herein). The enzyme may also be immobilized on the electrode surface following the guidance of the present specification and employing immobilization methods known in the art.

Although a number of methods and materials similar or equivalent to those described herein can be used in the practice of the present invention, some preferred materials and methods are described herein.

3. Exemplary Monitoring Systems

Numerous analyte monitoring systems can be used with sensor elements made using the compositions of the present invention. Typically, the monitoring system used to monitor the level of a selected analyte in a target system comprises a sampling device, which provides a sample comprising the analyte, and a sensing device, which detects the amount or concentration of the analyte or a signal associated with the analyte amount or concentration in the sample.

One exemplary monitoring system (the GlucoWatch biographers) is described herein for monitoring glucose levels in a biological system via iontophoretic, transdermal extraction of glucose from the biological system, particularly an animal subject, and then detection of signal corresponding to the amount or concentration of the extracted glucose. Analyte monitoring systems (including the GlucoWatch biographer) and components thereof, have been previously described (see, for example, U.S. Pat. Nos. 6,398,562, 6,393,318, 6,370,410, 6,341,232, 6391643, 6,309,351, 6,299,578, 6,298,254, 6,272,364, 6,233,471, 6,180,416, 6,144,869, 6,023,629, 5,989,409, 5,771,890, 6,356,776, 6,326,160, 6,284,126, 6,139,718, 5,954,685, 6,201,979, 6,141,573, 5,827,183, and 5,735,273, all herein incorporated by reference; and PCT International Publications WO0218936a2, Mar. 7, 2002; WO0217210a2, Feb. 28, 2002; WO0215778a1, Feb. 28, 2002; WO0215777a1, Feb. 28, 2002; WO0188534a3, Nov. 22, 2001; WO0188534a2, Nov. 22, 2001; WO0064533a1, Nov. 02, 2000; WO0047109a1, Aug. 17, 2000; WO0024455a1, May 4, 2000; WO0018289a1, Apr. 06, 2000; WO0015108a1, Mar. 23, 2000; WO9958973a1, Nov. 18, 1999; WO9958190a1, Nov. 18, 1999; WO9958051a1, Nov. 18, 1999; WO9958050a1, Nov. 18, 1999; WO9842252a1, Oct. 1, 1998; WO9724059a1, Jul. 10, 1997; WO9710499a1, Mar. 20, 1997; WO9710356a1, Mar. 20, 1997; WO9702811a1, Jan. 30, 1997; WO9600110a1, Jan. 4, 1996; and WO9600109a1, Jan. 4, 1996, all herein incorporated by reference). The GlucoWatch biographer line of products includes, but is not limited to, the first generation GlucoWatch® (Cygnus Inc., Redwood City, Calif.) biographer and the second generation GlucoWatch® G2™ (Cygnus Inc., Redwood City, Calif.) biographer. The GlucoWatch G2 biographer reduces warm-up time (from three to two hours), increases the number of readings per hour (up to six versus up to three), extends AutoSensor duration (from 12 to 13 hours), and provides predictive low-alert alarms. The GlucoWatch G2 biographer uses the same AutoSensor as the first generation GlucoWatch biographer.

Using the GlucoWatch biographer, transdermal extraction is carried out by applying an electrical current to a tissue surface at a collection site. The electrical current is used to extract small amounts of glucose from the subject into a collection reservoir. The collection reservoir is in contact with a sensor element (e.g., a biosensor) that provides for measurement of glucose concentration in the subject. As glucose is transdermally extracted into the collection reservoir, the analyte reacts with the glucose oxidase within the reservoir to produce hydrogen peroxide. The presence of hydrogen peroxide generates a current at the biosensor electrode that is directly proportional to the amount of hydrogen peroxide in the reservoir. This current provides a signal that can be detected and interpreted (for example, employing a selected algorithm) by an associated system controller to provide a glucose concentration value or amount for display.

In the use of the sampling system, a collection reservoir is contacted with a tissue surface, for example, on the stratum corneum of a subject's skin. An electrical current is then applied to the tissue surface in order to extract glucose from the tissue into the collection reservoir. Extraction is carried out, for example, frequently over a selected period of time. The collection reservoir is analyzed, at least periodically and typically frequently, to measure glucose concentration therein. The measured value correlates with the subject's blood glucose level.

Figure 2:
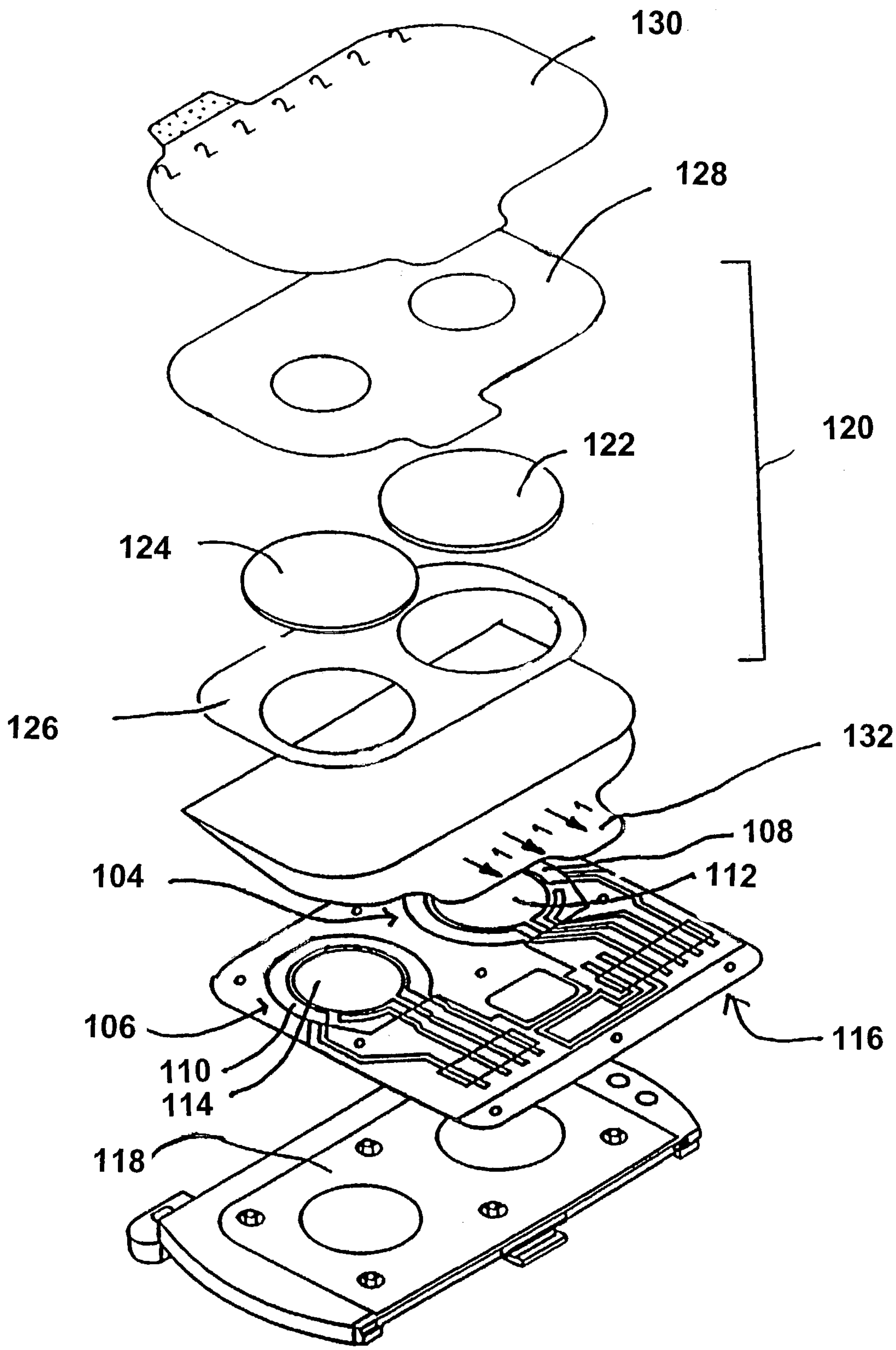
FIG. 2 presents a schematic of an exploded view of exemplary components comprising one embodiment of an AutoSensor for use in a monitoring system.
Figure 7:
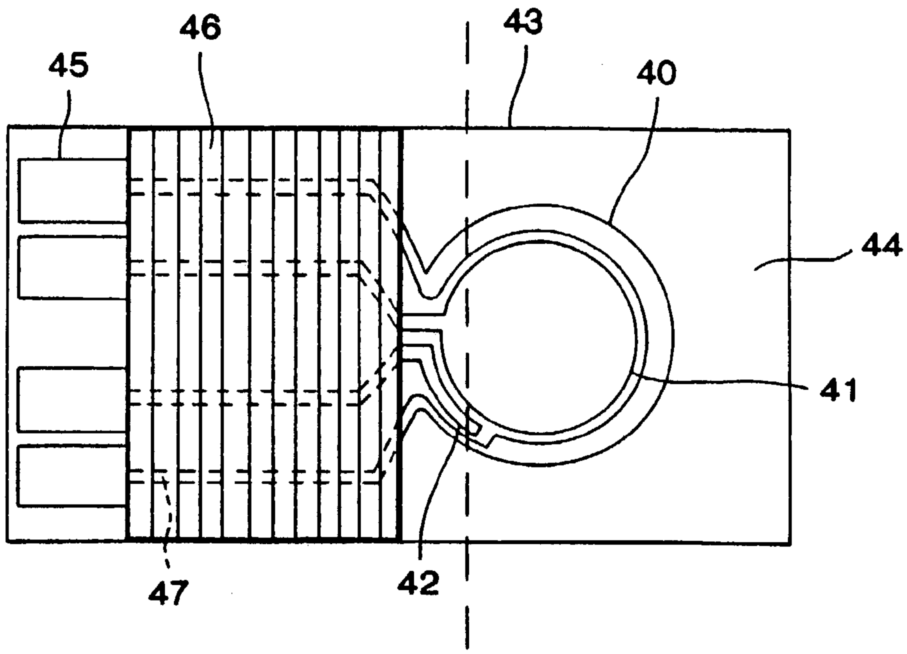
FIG. 7 is a representation of one embodiment of an electrode assembly design. The figure presents an overhead and schematic view of the electrode assembly 43. In the figure, a bimodal electrode is shown at 40 and can be, for example, a Ag/AgCl iontophoretic/counter electrode. The sensing or working electrode (made from, for example, a conductive polymer composition of the present invention) is shown at 41. The reference electrode is shown at 42 and can be, for example, a Ag/AgCl electrode. The components are mounted on a suitable nonconductive substrate 44, for example, plastic or ceramic. The conductive leads 47 leading to the connection pad 45 are covered by a second nonconductive piece 46 of similar or different material. In this example of such an electrode the working electrode area is approximately 1.35 $cm^2$. The dashed line in FIG. 7 represents the plane of the cross-sectional schematic view presented in FIG. 8.

To sample the analyte, one or more collection reservoirs are placed in contact with a tissue surface on a subject. The ionically conductive material within the collection reservoir is also in contact with an electrode (for reverse iontophoretic extraction) which generates a current sufficient to extract glucose from the tissue into the collection reservoir. Referring to FIG. 2, an exploded view of exemplary components comprising one embodiment of an AutoSensor for use in an iontophoretic sampling system is presented. The AutoSensor components include two biosensor/iontophoretic electrode assemblies, 104 and 106, each of which have an annular iontophoretic electrode, respectively indicated at 108 and 110, which encircles a biosensor electrode 112 and 114 (such biosensor electrodes may comprise the compositions of the present invention). The electrode assemblies 104 and 106 are printed onto a polymeric substrate 116 which is maintained within a sensor tray 118. A collection reservoir assembly 120 is arranged over the electrode assemblies, wherein the collection reservoir assembly comprises two hydrogel inserts 122 and 124 retained by a gel retaining layer 126 and mask layer 128. Further release liners may be included in the assembly, for example, a patient liner 130, and a plow-fold liner 132. In an alternative embodiment, the electrode assemblies can include bimodal electrodes (e.g., as shown in FIG. 7). A mask layer 128 (for example, as described in PCT Publication No. WO 97/10356, published 20 Mar. 1997, and U.S. Pat. Nos. 5,735,273, 5,827,183, 6,141,573, and 6,201,979, all herein incorporated by reference) may be present. Other AutoSensor embodiments are described in WO 99/58190, published 18, Nov. 1999, herein incorporated by reference.

The mask and retaining layers are preferably composed of materials that are substantially impermeable to the analyte (e.g., glucose) to be detected (see, for example, U.S. Pat. Nos. 5,735,273, and 6,393,318, both herein incorporated by reference). By "substantially impermeable" is meant that the material reduces or eliminates analyte transport (e.g., by diffusion). The material can allow for a low level of analyte transport, with the proviso that the analyte that passes through the material does not cause significant edge effects at the sensing electrode used in conjunction with the mask and retaining layers. Examples of materials that can be used to form the layers include, but are not limited to, polyester, polyester derivatives, other polyester-like materials, polyurethane, polyurethane derivatives and other polyurethane-like materials.

The components shown in exploded view in FIG. 2 are intended for use in a automatic sampling system which is configured to be worn like an ordinary wristwatch, as described, for example, in PCT Publication No. WO 96/00110, published 4, Jan. 1996, herein incorporated by reference. The wristwatch housing can further include suitable electronics (e.g., one or more microprocessor(s), memory, display and other circuit components) and power sources for operating the automatic sampling system. The one or more microprocessors may control a variety of functions, including, but not limited to, control of a sampling device, a sensing device, aspects of the measurement cycle (for example, timing of sampling and sensing, and alternating polarity between electrodes), connectivity, computational methods, different aspects of data manipulation (for example, acquisition, recording, recalling, comparing, and reporting), etc.

The sensing electrode can be, for example, a Pt-comprising electrode as described herein configured to provide a geometric surface area of about 0.1 to 3 $cm^2$, preferably about 0.5 to 2 $cm^2$, and more preferably about 1–1.5 $cm^2$. This particular configuration is scaled in proportion to the collection area of the collection reservoir used in the sampling system of the present invention, throughout which the extracted analyte and/or its reaction products will be present. The electrode composition is formulated using analytical- or electronic-grade reagents and solvents which ensure that electrochemical and/or other residual contaminants are avoided in the final composition, significantly reducing the background noise inherent in the resultant electrode. In particular, the reagents and solvents used in the formulation of the electrode are selected so as to be substantially free of electrochemically active contaminants (e.g., anti-oxidants), and the solvents in particular are typically selected for high volatility in order to reduce washing and cure times.

The reactive surface of the sensing electrode can be comprised of any electrically conductive material such as, but not limited to, platinum-group metals (including, platinum, palladium, rhodium, ruthenium, osmium, and iridium), nickel, copper, and carbon, as well as, oxides, dioxides, combinations or alloys thereof (as described herein).

Any suitable iontophoretic electrode system can be employed, an exemplary system uses a silver/silver chloride (Ag/AgCl) electrode system. The iontophoretic electrodes are formulated typically using two performance criteria: (1) the electrodes are capable of operation for extended periods, preferably periods of up to 24 hours or longer; and (2) the electrodes are formulated to have high electrochemical purity in order to operate within the present system which requires extremely low background noise levels. The electrodes must also be capable of passing a large amount of charge over the life of the electrodes. With regard to operation for extended periods of time, Ag/AgCl electrodes are capable of repeatedly forming a reversible couple that operates without unwanted electrochemical side reactions (which could give rise to changes in pH, and liberation of hydrogen and oxygen due to water hydrolysis). The Ag/AgCl electrode is thus formulated to withstand repeated cycles of current passage in the range of about 0.01 to 1.0 mA per $cm^2$ of electrode area. With regard to high electrochemical purity, the Ag/AgCl components are dispersed within a suitable polymer binder to provide an electrode composition that is not susceptible to attack (e.g., plasticization) by components in the collection reservoir, e.g., the hydrogel composition. The electrode compositions are also typically formulated using analytical- or electronic-grade reagents and solvents, and the polymer binder composition is selected to be free of electrochemically active contaminants that could diffuse to the biosensor to produce a background current.

The automatic sampling system can transdermally extract the sample over the course of a selected period of time using reverse iontophoresis. The collection reservoir comprises an ionically conductive medium, preferably the hydrogel medium described hereinabove. A first iontophoresis electrode is contacted with the collection reservoir (which is typically in contact with a target, subject tissue surface), and a second iontophoresis electrode is contacted with either a second collection reservoir in contact with the tissue surface, or some other ionically conductive medium in contact with the tissue. A power source provides an electrical potential between the two electrodes to perform reverse iontophoresis in a manner known in the art. As discussed above, the biosensor selected to detect the presence, and possibly the level, of the target analyte (for example, glucose) within a reservoir is also in contact with the reservoir. Typically, there are two collections reservoirs, each comprising glucose oxidase, and each in operative contact with iontophoretic electrode and a sensing electrode. The iontophoretic electrode may be a bimodal electrode that also serves, non-concurrently, as a counter electrode to the sensing electrode (see, for example, U.S. Pat. No. 5,954,685, herein incorporated by reference).

In practice, an electric potential (either direct current or a more complex waveform) is applied between the two iontophoresis electrodes such that current flows from the first electrode through the first conductive medium into the skin, and back out from the skin through the second conductive medium to the second electrode. This current flow extracts substances through the skin into the one or more collection reservoirs through the process of reverse iontophoresis or electroosmosis. The electric potential may be applied as described in PCT Publication No. WO 96/00110, published 4, Jan. 1996, herein incorporated by reference. Typically, the electrical potential is alternated between two reservoirs to provide extraction of analyte into each reservoir in an alternating fashion (see, for example, U.S. Pat. Nos. 5,771,890, 5,954,685, both herein incorporated by reference). Analyte is also typically detected in each reservoir.

As an example, to extract glucose, the applied electrical current density on the skin or tissue can be in the range of about 0.01 to about 2 $mA/cm^2$. In order to facilitate the extraction of glucose, electrical energy can be applied to the electrodes, and the polarity of the electrodes can be, for example, alternated so that each electrode is alternately a cathode or an anode. The polarity switching can be manual or automatic.

When a bimodal electrode is used (e.g., U.S. Pat. No. 5,954,685, herein incorporated by reference), during the reverse iontophoretic phase, a power source provides a current flow to the first bimodal electrode to facilitate the extraction of the chemical signal into the reservoir. During the sensing phase, a separate power source is used to provide voltage to the first sensing electrode to drive the conversion of chemical signal retained in reservoir to electrical signal at the catalytic face of the sensing electrode. The separate power source also maintains a fixed potential at the electrode where, for example hydrogen peroxide is converted to molecular oxygen, hydrogen ions, and electrons, which is compared with the potential of the reference electrode during the sensing phase. While one sensing electrode is operating in the sensing mode it is electrically connected to the adjacent bimodal electrode which acts as a counter electrode at which electrons generated at the sensing electrode are consumed.

Figure 8:
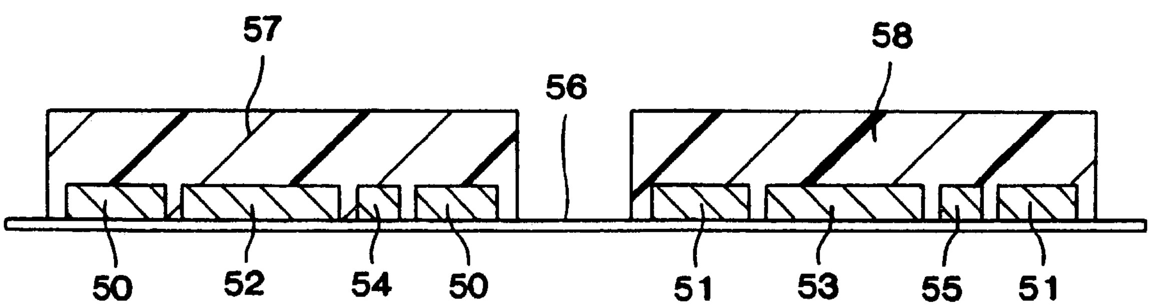
FIG. 8 is a representation of a cross-sectional schematic view of the bimodal electrodes as they may be used in conjunction with a reference electrode and a hydrogel, for example, comprising glucose oxidase. In the figure, the components are as follows: bimodal electrodes 50 and 51; sensing electrodes 52 and 53; reference electrodes 54 and 55; a substrate 56; and hydrogel pads 57 and 58.

Following here is an example of how a sampling device can be operated in an alternating polarity mode using first and second bimodal electrodes (FIG. 8, 50 and 51) and two collection reservoirs (FIG. 8, 57 and 58). Each bi-modal electrode (FIG. 7, 40; FIG. 8, 50 and 51) serves two functions depending on the phase of the operation: (1) an electro-osmotic electrode (or iontophoretic electrode) used to electrically draw analyte from a source into a collection reservoir comprising water and an electrolyte, and to the area of the electrode subassembly; and (2) as a counter electrode to the first sensing electrode at which the chemical compound is catalytically converted at the face of the sensing electrode to produce an electrical signal.

The reference (FIG. 8, 54 and 55; FIG. 7, 42) and sensing electrodes (FIG. 8, 52 and 53; FIG. 7, 41), as well as, the bimodal electrode (FIG. 8, 50 and 51; FIG. 7, 40) are connected to standard potentiostat circuits during sensing. In general, practical limitations of the system require that the bimodal electrode will not act as both a counter and iontophoretic electrode simultaneously.

The general operation of an iontophoretic sampling system in this embodiment is the cyclical repetition of two phases: (1) a reverse-iontophoretic phase, followed by a (2) sensing phase. During the reverse iontophoretic phase, the first bimodal electrode (FIG. 8, 50) acts as an iontophoretic cathode and the second bimodal electrode (FIG. 8, 51) acts as an iontophoretic anode to complete the circuit. As iontophoretic current is passed, analyte is collected in the reservoirs, for example, a hydrogel (FIG. 8, 57 and 58). At the end of the reverse iontophoretic phase, the iontophoretic current is turned off. During the sensing phase, in the case of glucose, a potential is applied between the reference electrode (FIG. 8, 54) and the sensing electrode (FIG. 8, 52). The sensing electrode may comprise a conductive polymer composition of the present invention. The chemical signal reacts electro-catalytically on the catalytic face of the first sensing electrode (FIG. 8, 52) producing an electrical current, while the first bi-modal electrode (FIG. 8, 50) acts as a counter electrode to complete the electrical circuit.

The sensing electrode (for example, printed using a conductive polymer composition of the present invention) may be adapted, for example, for use in conjunction with a hydrogel collection reservoir system for monitoring glucose levels in a subject through the reaction of collected glucose with the enzyme glucose oxidase present in the hydrogel matrix. Further applications are discussed herein.

The bi-modal electrode is preferably comprised of Ag/AgCl. The electrochemical reaction that occurs at the surface of this electrode serves as a facile source or sink for electrical current. This property is especially important for the iontophoresis function of the electrode. Lacking this reaction, the iontophoresis current could cause the hydrolysis of water to occur at the iontophoresis electrodes causing pH changes and possible gas bubble formation. The pH changes to acidic or basic pH could cause skin irritation or burns. The ability of an Ag/AgCl electrode to easily act as a source of sink current is also an advantage for its counter electrode function. For a three-electrode electrochemical cell to function properly, the current generation capacity of the counter electrode typically should not limit the speed of the reaction at the sensing electrode. In the case of a large sensing electrode, the counter electrode should be able to source proportionately larger currents.

The electrode subassembly can be operated by electrically connecting the bimodal electrodes such that each electrode is capable of functioning as both an iontophoretic electrode and counter electrode along with appropriate sensing electrode(s) and reference electrode(s).

A potentiostat is an electrical circuit used in electrochemical measurements in three electrode electrochemical cells. A potential is applied between the reference electrode and the sensing electrode. The current generated at the sensing electrode flows through circuitry to the counter electrode (i.e., no current flows through the reference electrode to alter its equilibrium potential). Two independent potentiostat circuits can be used to operate the two biosensors. For the purpose of the present invention, the electrical current measured at the sensing electrode subassembly is the current that is correlated with an amount of chemical signal corresponding to the analyte.

The detected current can be correlated with the subject's blood glucose concentration (e.g., using a statistical technique or algorithm or combination of techniques) so that the system controller may display the subject's actual blood glucose concentration as measured by the sampling system. Such statistical techniques can be formulated as algorithm(s) and incorporated in one or more microprocessor(s) associated with the sampling system. Exemplary signal processing applications include, but are not limited to, those taught in the following U.S. Pat. Nos. 6,144,869, 6,233,471, 6,180,416, herein incorporated by reference.

In a further aspect of the present invention, the sampling/sensing mechanism and user interface may be found on separate components. Thus, the monitoring system can comprise at least two components, in which a first component comprises sampling mechanism and sensing mechanism that are used to extract and detect an analyte, for example, glucose, and a second component that receives the analyte data from the first component, conducts data processing on the analyte data to determine an analyte concentration and then displays the analyte concentration data. Typically, microprocessor functions (e.g., control of a sampling device, a sensing device, aspects of the measurement cycle, computational methods, different aspects of data manipulation or recording, etc.) are found in both components. Alternatively, microprocessing components may be located in one or the other of the at least two components. The second component of the monitoring system can assume many forms, including, but not limited to, the following: a watch, a credit card-shaped device (e.g., a "smart card" or "universal card" having a built-in microprocessor as described for example in U.S. Pat. No. 5,892,661, herein incorporated by reference), a pager-like device, cell phone-like device, or other such device that communicates information to the user visually, audibly, or kinesthetically.

Further, additional components may be added to the system, for example, a third component comprising a display of analyte values or an alarm related to analyte concentration, may be employed. In certain embodiments, a delivery unit is included in the system. An exemplary delivery unit is an insulin delivery unit. Insulin delivery units, both implantable and external, are known in the art and described, for example, in U.S. Pat. Nos. 5,995,860; 5,112,614 and 5,062,841, herein incorporated by reference. Preferably, when included as a component of the present invention, the delivery unit is in communication (e.g., wire-like or wireless communication) with the extracting and/or sensing mechanism such that the sensing mechanism can control the insulin pump and regulate delivery of a suitable amount of insulin to the subject.

Advantages of separating the first component (e.g., including the biosensor and iontophoresis functions) from the second component (e.g., including some microprocessor and display functions) include greater flexibility, discretion, privacy and convenience to the user. Having a small and lightweight measurement unit allows placement of the two components of the system on a wider range of body sites, for example, the first component may be placed on the abdomen or upper arm. This wider range of placement options may improve the accuracy through optimal extraction site selection (e.g., torso rather than extremities) and greater temperature stability (e.g., via the insulating effects of clothing). Thus, the collection and sensing assembly will be able to be placed on a greater range of body sites. Similarly, a smaller and less obtrusive microprocessor and display unit (the second component) provides a convenient and discrete system by which to monitor analytes. The biosensor readouts and control signals will be relayed via wire-like or wireless technology between the collection and sensing assembly and the display unit which could take the form of a small watch, a pager, or a credit card-sized device. This system also provides the ability to relay an alert message or signal during nighttime use, for example, to a site remote from the subject being monitored.

In one embodiment, the two components of the device can be in operative communication via a wire or cable-like connection. Operative communications between the components can be wireless link, i.e. provided by a "virtual cable," for example, a telemetry link. This wireless link can be uni- or bi-directional between the two components. In the case of more than two components, links can be a combination of wire-like and wireless.

4. Exemplary Analytes

The analyte can be any one or more specific substance, component, or combinations thereof that one is desirous of detecting and/or measuring in a chemical, physical, enzymatic, optical analysis, or combinations thereof.

Analytes that can be measured using the methods of the present invention include, but are not limited to, amino acids, enzyme substrates or products indicating a disease state or condition, other markers of disease states or conditions, drugs of abuse (e.g., ethanol, cocaine), therapeutic and/or pharmacologic agents (e.g., theophylline, anti-HIV drugs, lithium, anti-epileptic drugs, cyclosporin, chemotherapeutics), electrolytes, physiological analytes of interest (e.g., urate/uric acid, carbonate, calcium, potassium, sodium, chloride, bicarbonate ($CO_2$), glucose, urea (blood urea nitrogen), lactate and/or lactic acid, hydroxybutyrate, cholesterol, triglycerides, creatine, creatinine, insulin, hematocrit, and hemoglobin), blood gases (carbon dioxide, oxygen, pH), lipids, heavy metals (e.g., lead, copper), and the like. Analytes in non-biological systems may also be evaluated using the methods of the present invention.

In preferred embodiments, the analyte is a physiological analyte of interest, for example glucose, or a chemical that has a physiological action, for example a drug or pharmacological agent.

In order to facilitate detection of the analyte, an enzyme (or enzymes) can be disposed within the one or more collection reservoirs. The selected enzyme is capable of catalyzing a reaction with the extracted analyte to the extent that a product of this reaction can be sensed, e.g., can be detected electrochemically from the generation of a current which current is detectable and proportional to the amount of the analyte which is reacted. In one embodiment of the present invention, a suitable enzyme is glucose oxidase, which oxidizes glucose to gluconic acid and hydrogen peroxide. The subsequent detection of hydrogen peroxide on an appropriate biosensor electrode generates two electrons per hydrogen peroxide molecule creating a current that can be detected and related to the amount of glucose entering the device. Glucose oxidase (GOx) is readily available commercially and has well known catalytic characteristics. However, other enzymes can also be used singly (for detection of individual analytes) or together (for detection of multiple analytes), as long as they specifically catalyze a reaction with an analyte or substance of interest to generate a detectable product in proportion to the amount of analyte so reacted.

In like manner, a number of other analyte-specific enzyme systems can be used in the invention, which enzyme systems operate on much the same general techniques. For example, a biosensor electrode that detects hydrogen peroxide can be used to detect ethanol using an alcohol oxidase enzyme system, or similarly uric acid with urate oxidase system, cholesterol with a cholesterol oxidase system, and theophylline with a xanthine oxidase system.

In addition, the oxidase enzyme (used for hydrogen peroxidase-based detection) can be replaced or complemented with another redox system, for example, the dehydrogenase-enzyme NAD-NADH, which offers a separate route to detecting additional analytes. Dehydrogenase-based sensors can use working electrodes made of gold or carbon (via mediated chemistry). Examples of analytes suitable for this type of monitoring include, but are not limited to, cholesterol, ethanol, hydroxybutyrate, phenylalanine, triglycerides, and urea.

Further, the enzyme can be eliminated and detection can rely on direct electrochemical or potentiometric detection of an analyte. Such analytes include, without limitation, heavy metals (e.g., cobalt, iron, lead, nickel, zinc), oxygen, carbonate/carbon dioxide, chloride, fluoride, lithium, pH, potassium, sodium, and urea. Also, the sampling system described herein can be used for therapeutic drug monitoring, for example, monitoring anti-epileptic drugs (e.g., phenytoin), chemotherapy (e.g., adriamycin), hyperactivity (e.g., ritalin), and anti-organ-rejection (e.g., cyclosporin).

Preferably, a sensor electrode is able to detect the analyte that has been extracted into the one or more collection reservoirs when present at nominal concentration levels. Suitable exemplary biosensor electrodes can be made using the conductive polymer compositions of the present invention.

A single sensor may detect multiple analytes and/or reaction products of analytes. For example, a platinum sensor could be used to detect tyrosine and glucose in a single sample. The tyrosine is detected, for example, by direct electrochemical oxidation at a suitable electrode potential (e.g., approximately 0.6V vs. Ag/AgCl). The glucose is detected, e.g., using glucose oxidase and detecting the hydrogen peroxide reaction product.

Different sensing devices and/or sensing systems can be employed as well to distinguish between signals. For example, a first gel containing glucose oxidase associated with a first platinum sensor can be used for the detection of glucose, while a second gel containing uricase associated with a second platinum sensor can be used for the detection of urea.

EXPERIMENTAL

The following examples are put forth so as to provide those of ordinary skill in the art with a complete disclosure and description of how to make and use the devices, methods, and formulae of the present invention, and are not intended to limit the scope of what the inventor regards as the invention. Efforts have been made to ensure accuracy with respect to numbers used (e.g., amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Example 1

Formulation of a 1% Catalyst Ink

A polymer solution was prepared by mixing one part poly(styrene-co-methyl methacrylate) (Aldrich, catalog #46, 289-6) and three parts ethylene glycol diacetate (EGDA). Approximately 22.42 g of the polystyrene-co-methyl-methacrylate polymer solution was mixed with about 46.19 g EGDA. To the polymer solution were added 20.63 g graphite (Timrex SFG-15, Timcal), and 5.5 g 5% platinum-on-graphite (Type 98199, Johnson-Matthey). The solution was mixed by hand until a homogenous mixture was obtained. The ink was then subjected to high shear mixing with a triple-roll mill. Three passes through the mill were typically used. The jar of ink was kept rolling on a jar roller to maintain dispersion of the ingredients and to prevent settling. Before printing, additional EGDA may be added to adjust the viscosity for optimal printing. Ink screen-printing was performed using a 180 mesh stainless steel screen and a 90 durometer squeegee. The 1% catalyst ink formulation is 1 part Pt to 99 parts graphite. With solvent the weight percent of Pt in the catalyst ink formulation is about 0.2705%. After printing and drying the weight percent of Pt in the printed electrode is about 0.85%.

Example 2

Comparison of Different Compositions

Figure 1B:
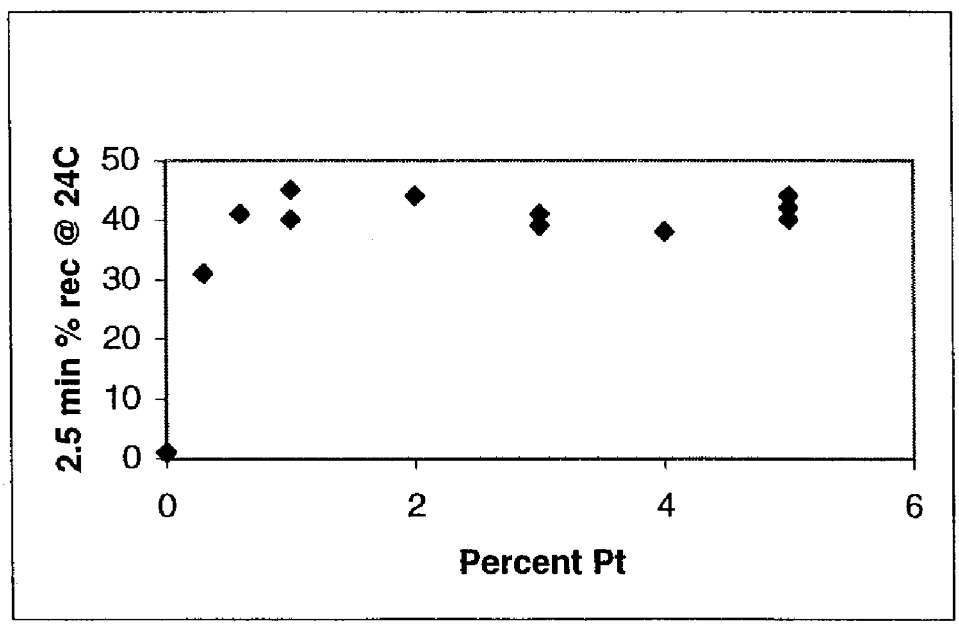
FIG. 1B presents percent recovery after 2.5 minutes for compositions having between 0–5% Pt and poly(styrene-co-methyl methacrylate) binder.

The performance of poly(styrene-co-methyl methacrylate) containing compositions containing different amounts of a catalyst were compared. Compositions having 0.6%, 0.3% and 0% of the catalyst were prepared by the method of Example 1 by adding an appropriate amount of platinum-on-graphite. Compositions having greater than 1% catalyst (e.g., 1 part platinum to 99 parts graphite) made by a modified method of Example 1. The total catalyst concentration was obtained by adding Pt/C to a platinum content of 1% and then variable amounts of platinum black were added to increase the platinum concentration to the desired level. The comparative data for formulations having total Ptb concentrations of 5% to 0% are shown in Table 1. The data for background percent platinum are plotted in FIG. 1A. The data for percent recovery plotted against total percent platinum are plotted in FIG. 1B.

TABLE 1

| | 24° C. | | | 32° C. | | |
|---|---|---|---|---|---|---|
| Total % Pt | BG (nA) | 2.5 min recovery | 10 min recovery | BG (nA) | 2.5 min recovery | 7 min recovery |
| 5 | 107 | 42 | 89 | 137 | 75 | 95 |
| 4 | 117 | 38 | 88 | 141 | 70 | 96 |
| 3 | 106 | 41 | 87 | 129 | 75 | 97 |

TABLE 1-continued

| | 24° C. | | | 32° C. | | |
|---|---|---|---|---|---|---|
| Total % Pt | BG (nA) | 2.5 min recovery | 10 min recovery | BG (nA) | 2.5 min recovery | 7 min recovery |
| 3 | 116 | 39 | 90 | 113 | 66 | 96 |
| 2 | 125 | 44 | 92 | 130 | 71 | 101 |
| 1 | 126 | 40 | 91 | 101 | 70 | 101 |
| 1 | 126 | 45 | 92 | 113 | 86 | 116 |
| 0.6 | 105 | 41 | 92 | 66 | 82 | 114 |
| 0.3 | 69 | 31 | 83 | 61 | 67 | 105 |
| 0 | 53 | 1 | 5 | 36 | 3 | 5 |

Table 1 presents data relating to the performance of ink formulations made with variable Pt content. The data in Table 1 were obtained by placing the printed sensor in contact with a hydrogel electrolyte, and pipetting a known amount a solution of glucose to the surface of the hydrogel. The hydrogel was approximately 7 mil (175 microns) thick and contained glucose oxidase enzyme to oxidize glucose, producing hydrogen peroxide as a product. A wicking material was placed onto the surface of the hydrogel to facilitate spreading of the glucose solution over the surface of the hydrogel. This technique was performed at two different temperatures, 24° C. and 32° C.

In this procedure, the biosensor was biased, and the background allowed to come to equilibrium for one hour. Ten microliters of 0.2 mM glucose were pipetted the wick on the surface of the gel. The current from the biosensor was measured for 50 minutes. The current was integrated over time. The percentage of the total theoretical charge recovered in 2.5 minutes and 10 minutes (for the 24° C. test) or 2.5 minutes and 7 minutes (for the 32° C. test) was calculated, and reported as a measure of the sensitivity of the electrode. A high-sensitivity electrode will exhibit high percent recoveries at the 2.5 minute time point, approaching 100% recovery by the 7 minute mark (for the 32° C. test).

In Table 1, the first column shows the weight percent of platinum (relative to the weight of the graphite, e.g., 1% platinum is 1 part platinum to 99 parts graphite), the second column shows the background (BG) current measured in nanoamps performed at 24° C., the third column shows the recovery at 2.5 minutes performed at 24° C., the fourth column shows the recovery at 10 minutes performed at 24° C., the fifth column shows the background (BG) current measured in nanoamps performed at 32° C., the sixth column shows the recovery at 2.5 minutes performed at 32° C., the seventh column shows the recovery at 7 minutes performed at 32° C.

The composition with no catalyst served as the control. The platinum-free ink has lower background and has no sensitivity to peroxide, as expected. The compositions with 5% to 1% Pt (Pt weight percent of the total graphite) have higher background than the control, while the compositions having less than 1% Pt (Pt weight percent of the total graphite) have backgrounds in between. However, the sensitivity of the compositions containing 5%–0.6% Pt (Pt weight percent of the total graphite) is comparable. These data demonstrate that by using poly(styrene-co-methyl methacrylate) as the polymer binder, the catalyst concentration can be reduced to 1% or lower and retain acceptable sensitivity.

Example 3

Comparison of Two Ink Formulations

Eight human subjects were used. Each subject wore six GlucoWatch G2 biographers (three per condition). Two conditions were tested:

Condition 1: Control (Standard Sensor ink, Standard Hydrogel).

Condition 2: Sensor Ink of the present invention, Standard Hydrogel.

The formulation of the sensor ink of the present invention was described above (e.g., Example 1). The standard ink sensor has been previously described (see, for example, EP 0 942 278 B1, or GB 2 335 278A, both herein incorporated by reference).

The study duration was 14 hours, 58 minutes. Reference blood glucose measurements were taken at least two times per hour. The reference blood measurements were taken twenty minutes prior to the corresponding GlucoWatch biographer measurements to account for the twenty minute lag time between taking the reference blood glucose measurement (i.e., by fingerstick) and obtaining the corresponding glucose measurement using the GlucoWatch biographer.

Average baseline values were temperature corrected with respect to desired calibration time and calculated using previous baseline-determined calculations. Graphs of integrated GlucoWatch biographer signals (in units of nC) were made for sensors A and B on the primary y-axis and reference blood glucose (in units of mg/dl) on the x-axis. Data were processed using ordinary least squares linear regression to obtain $R^2$, slope and intercept.

The results of this experiment compared the performance of analyte monitoring systems employing standard sensors and sensors printed with an ink formulation of the present invention. The following Table 2 summarizes the results.

TABLE 2

| Condition | $R^2$ Sensor A + B | Least Squares Slope (nC/(mg/dL)) Sensor A + B | Least Squares Intercept (nC) Sensor A + B |
|---|---|---|---|
| Control (Standard Sensor, Standard Hydrogel) | 0.62 | 201 | −4,176 |
| Sensor Ink of the present invention, Standard Hydrogel. | 0.55 | 224 | −2,939 |

Sensitivity was higher for the sensor using an ink formulation of the present invention; the sensor ink of the present invention/standard hydrogel condition displayed greater sensitivity than the control. The higher sensitivity of the ink formulation of the present invention suggests that the sensor ink formulation of the present invention positively influences performance.

Further, the number of skips (see, e.g., U.S. Pat. No. 6,233,471) during monitoring were evaluated for the two conditions described above.

TABLE 3

| Condition | Total Readings that were skipped |
|---|---|
| Control (Standard Sensor, Standard Hydrogel) | 30% |

TABLE 3-continued

| Condition | Total Readings that were skipped |
|---|---|
| Sensor ink of the present invention ink, Standard Hydrogel. | 22% |

These results demonstrate improved sensitivity of an analyte monitoring device when the device employs sensors created using the ink formulation of the present invention.

Example 4

Figure 6:
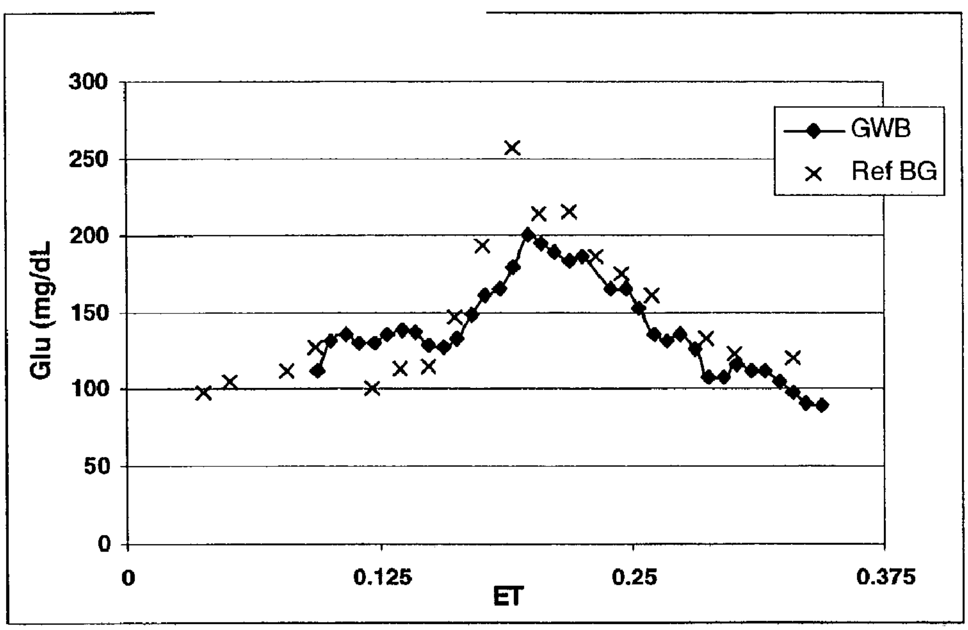
FIG. 6 presents a plot of GlucoWatch biographer readings and the blood glucose measurements wherein the sensor of the GlucoWatch biographer comprises the ink of the present invention. The subject who was monitored was a subject with diabetes.

Use of the Sensors of the Present Invention to Track Glucose in a Subject with Diabetes In a separate study, under similar conditions to those described in Example 3, sensors incorporating an ink formulation of the present invention (described in Example 1) were used in the GlucoWatch biographer to monitor glucose levels in a subject with diabetes. Plots of the GlucoWatch biographer readings (diamonds) and blood glucose measurements taken by a standard finger-prick method ("x") plotted relative to elapsed time are presented in FIG. 6. The results presented in FIG. 6 illustrate that the sensors incorporating an ink formulation of the present invention provides good tracking of the blood glucose in a subject with diabetes over the course of the study.

As is apparent to one of skill in the art, various modification and variations of the above embodiments can be made without departing from the spirit and scope of this invention. Such modifications and variations are within the scope of this invention.

What is claimed is:

1. A conductive polymer composition comprising:

about 0.01% a to about 5% by weight, based on the total weight of the dry composition, of a transition metal catalyst selected from the group consisting of platinum, palladium, and rhodium;

an electrically conductive graphite selected from the group consisting of synthetic graphite, pyrolytic graphite, and natural graphite; and a copolymer of unsubstituted styrene and methyl methacrylate.

2. The composition of claim 1, wherein the composition comprises about 0.1% to about 2% by weight of the catalyst, about 50% to about 75% of the graphite, and about 15% to about 25% of the copolymer, based on the total weight of the dry composition.

3. The composition of claim 2, wherein the catalyst is platinum.

4. The composition of claim 2, wherein the catalyst is platinum and said platinum is deposited on graphite.

5. The composition of claim 1, wherein the copolymer is obtained by copolymerizing a mixture of unsubstituted styrene and methyl methacrylate, and the unsubstituted styrene is present in an amount between about 10% to about 90% by weight of the reaction mixture of unsubstituted styrene and methyl methacrylate.

6. The composition of claim 1, wherein the copolymer is obtained by copolymerizing a mixture of unsubstituted styrene and methyl methacrylate, and the unsubstituted styrene is present in an amount between about 40% to about 80% by weight of the reaction mixture of unsubstituted styrene and methyl methacrylate.

7. The composition of claim 6, wherein the catalyst is platinum and said platinum is deposited on graphite.

8. The composition of claim 2, wherein the copolymer is obtained by copolymerizing a mixture of unsubstituted styrene and methyl methacrylate; the methyl methacrylate is present at a concentration from about 40% to about 90% by weight or the mixture of unsubstituted styrene and methyl methacrylate; and the unsubstituted styrene is present at a concentration from about 10% to about 60% by weight of the mixture of unsubstituted styrene and methyl methacrylate.

9. The composition of claim 8, wherein the catalyst is platinum and said platinum is deposited on graphite.

10. The composition of claim 8, wherein the composition consists of the catalyst, the graphite, and the copolymer.

11. The composition of claim 10, wherein the catalyst is platinum and said platinum is deposited on graphite.

12. An electrode, the electrode comprising the conductive polymer composition of claim 10 on a non-conducting substrate.

13. A method of producing the conductive polymer composition of claim 1, said method comprising mixing said transition metal catalyst, said graphite, said copolymer, and a solvent to obtain a homogenous mixture, and removing said solvent.

14. A method of making the electrode of claim 12, said method comprising mixing said transition metal catalyst, said graphite, said copolymer, and a solvent to obtain a homogenous mixture, depositing said homogenous mixture on said non-conducting substrate, and removing said solvent.

15. An ink composition, comprising:

about 0.003% to about 1.6% by weight of a transition metal catalyst selected from the group consisting of platinum, palladium, and rhodium;

an electrically conductive graphite selected from the group consisting of synthetic graphite, pyrolytic graphite, and natural graphite;

a copolymer of unsubstituted styrene and methyl methacrylate; and an organic solvent;

wherein the % by weight of the transition metal catalyst is based on the total weight of the total weight of the solvent, the graphite, the transition metal catalyst, and the copolymer.

16. The composition of claim 15 wherein the composition comprises about 0.03% to about 1% by weight of the catalyst, about 15% to about 25% of the graphite, about 4% to about 8% of the copolymer, and about 50% to 80% of the solvent, based on the total weight of the solvent, the graphite, the transition metal catalyst, and the copolymer.

17. The composition of claim 16 wherein the solvent is glycol diacetate.

18. The composition of claim 16 wherein the solvent is ethylene glycol diacetate.

19. The composition of claim 16, wherein the copolymer is obtained by copolymerizing a mixture of unsubstituted styrene and methyl methacrylate; the methyl methacrylate is present at a concentration from about 40% to about 9% by weight of the mixture of unsubstituted styrene and methyl methacrylate; and the unsubstituted styrene is present at a concentration from about 10% to about 60% by weight of the mixture of unsubstituted styrene and methyl methacrylate.

20. The composition of claim 19, wherein the catalyst is platinum.

21. The composition of claim 19, wherein the catalyst is platinum and said platinum is deposited on graphite.

22. The composition of claim 16, wherein the composition consists of the catalyst, the graphite, the copolymer, and the solvent.

23. The composition of claim 22, wherein graphite is synthetic graphite or pyrolytic graphite.

24. The composition of claim 22, wherein the solvent is ethylene glycol diacetate.

25. A method of making an electrode, the method comprising depositing the ink composition of claim 19 on a non-conducting substrate, and removing said solvent.

26. An ink composition, comprising: about 0.03% to about 1.0% by weight of a transition metal catalyst selected from the group consisting of platinum, palladium, and rhodium; a copolymer of unsubstituted styrene and methyl methacrylate; graphite; and glycol diacetate, wherein the % by weight of the transition metal catalyst is based on the total weight of the glycol diacetate, the graphite, the transition metal catalyst, and the copolymer.

27. The composition of claim 26, wherein the catalyst is platinum and the platinum is deposited on graphite.

28. The composition of claim 27 wherein the composition comprises about 0.03% to about 1% by weight of the catalyst, about 15% to about 25% by weight of the graphite, about 4% to about 8% by weight of the copolymer, and about 50% to 80% by weight of the glycol diacetate, based on the total weight of the glycol diacetate, the graphite, the transition metal catalyst, and the copolymer.

29. The composition of claim 28, wherein the composition consists of the glycol diacetate, the graphite, the transition metal catalyst, and the copolymer.

30. The composition of claim 29, wherein the glycol diacetate is ethylene glycol diacetate.

* * * * *

UNITED STATES PATENT AND TRADEMARK OFFICE

CERTIFICATE OF CORRECTION

PATENT NO. : 7,018,568 B2
APPLICATION NO. : 10/327506
DATED : March 28, 2006
INVENTOR(S) : Tierney It is certified that error appears in the above-identified patent and that said Letters Patent is hereby corrected as shown below:

In column 35, line 38, claim 1 of the Letters Patent, “a” is deleted.

In column 36, line 60, claim 19 of the Letters Patent, “9%” should read 90%.

Signed and Sealed this

First Day of August, 2006

JON W. DUDAS

*Director of the United States Patent and Trademark Office*